United States Patent
Nowak et al.

(10) Patent No.: US 6,757,545 B2
(45) Date of Patent: Jun. 29, 2004

(54) LOCATION INFORMATION MANAGEMENT SYSTEM AND METHOD FOR MOBILE COMMUNICATIONS UNIT

(76) Inventors: Steven P. Nowak, 1222 S. Mesa Ct., Superior, CO (US) 80027; James A. Fitch, 827 Walnut St., Edmonds, WA (US) 98020-3304

(*) Notice: Subject to any disclaimer, the term of this patent is extended or adjusted under 35 U.S.C. 154(b) by 0 days.

(21) Appl. No.: 09/796,972

(22) Filed: Mar. 1, 2001

(65) Prior Publication Data

US 2002/0193121 A1 Dec. 19, 2002

(51) Int. Cl.⁷ .......................... H04Q 7/20; H04M 11/04
(52) U.S. Cl. ............................ 455/456.2; 455/404.2; 342/357.01
(58) Field of Search .......................... 455/456.1, 404.2, 455/422.1, 450, 457; 342/357.01, 442, 457; 1/456.2

(56) References Cited

U.S. PATENT DOCUMENTS

| | | | |
|---|---|---|---|
| 5,166,694 A | 11/1992 | Russell et al. | 342/457 |
| 5,913,170 A | 6/1999 | Wortham | 455/457 |
| 5,926,133 A * | 7/1999 | Green, Jr. | 342/363 |
| 5,930,713 A * | 7/1999 | Nguyen | 455/456.5 |
| 5,999,126 A | 12/1999 | Ito | 342/357.1 |
| 6,035,202 A * | 3/2000 | Camp, Jr. | 455/456 |
| 6,108,555 A * | 8/2000 | Maloney et al. | 342/457 |
| 6,154,657 A | 11/2000 | Grubeck et al. | 455/456 |
| 6,204,808 B1 | 3/2001 | Bloebaum et al. | 342/357.07 |
| 6,212,391 B1 * | 4/2001 | Saleh et al. | 342/450 |
| 6,240,069 B1 * | 5/2001 | Alperovich et al. | 370/260 |
| 6,249,252 B1 * | 6/2001 | Dupray | 342/357.01 |
| 6,266,014 B1 * | 7/2001 | Fattouche et al. | 342/450 |
| 6,266,534 B1 * | 7/2001 | Raith et al. | 455/456 |
| 6,282,427 B1 * | 8/2001 | Larsson et al. | 342/450 |
| 6,289,279 B1 * | 9/2001 | Ito et al. | 342/357.1 |
| 6,300,904 B1 * | 10/2001 | Dvorak et al. | 342/457 |
| 6,311,069 B1 * | 10/2001 | Havinis et al. | 455/456.4 |
| 6,321,092 B1 * | 11/2001 | Fitch et al. | 455/456 |
| 6,324,406 B1 * | 11/2001 | Zadeh | 455/456 |
| 6,330,452 B1 * | 12/2001 | Fattouche et al. | 342/457 |
| 6,347,227 B1 * | 2/2002 | Johansson | 455/456 |
| 6,347,228 B1 * | 2/2002 | Ludden et al. | 342/450 |
| 6,397,071 B1 * | 5/2002 | Hussain et al. | 455/456 |
| 6,408,246 B1 * | 6/2002 | Fox | 701/300 |
| 6,556,831 B1 * | 4/2003 | Buppelmann | 455/403 |
| 2001/0036832 A1 * | 11/2001 | McKay | 455/456 |

* cited by examiner

Primary Examiner—Quochien B. Vuong
(74) Attorney, Agent, or Firm—Marsh Fischmann & Breyfogle LLP

(57) ABSTRACT

A system and method for managing the provisioning of location information on a mobile communications unit (e.g., a cellular phone) is disclosed. When a request for location information on a particular mobile communications unit is received, the general location of the mobile communications unit may be determined. This general location information may then be used to determine if any position determination equipment site would be able to provide the desired location information. Therefore, a request for location information on a given mobile communications unit is not invoked to a particular position determination equipment site until it has been first determined that the position determination equipment site would in fact be able to provide the desired location information.

23 Claims, 14 Drawing Sheets

| PDE Site | PDE Technology Type | Physical Location | Coverage Area | Position Accuracy | Computational Speed | Computational Cost |
|---|---|---|---|---|---|---|
| | | | | | | |
| | | | | | | |
| | | | | | | |
| | | | | | | |
| | | | | | | |

570 — PDE Site
574 — PDE Technology Type
578 — Physical Location
582 — Coverage Area
586 — Position Accuracy
590 — Computational Speed
594 — Computational Cost 566a, 566b, 566c, 566d, 566"n"

LOCATION INFORMATION MANAGEMENT SYSTEM AND METHOD FOR MOBILE COMMUNICATIONS UNIT

CROSS-REFERENCE TO RELATED APPLICATIONS

This application contains subject matter that is disclosed in U.S. patent application Ser. No. 09/396,235, which is entitled "Multiple Input Data Management for Wireless Location-Based Applications, which was filed on Sep. 15, 1999, and the entire disclosure of which is incorporated by reference in its entirety herein.

FIELD OF THE INVENTION

The present invention generally relates to the use of location finding equipment (LFE) or position determination equipment (PDE) in relation to a mobile communications system (e.g., a wireless network) and, more particularly, to managing the provisioning of location information on mobile communications units.

BACKGROUND OF THE INVENTION

Wireless communications networks generally allow for voice and/or data communication between wireless stations, e.g., wireless telephones (analog, digital cellular and PCS), pagers or data terminals that communicate using RF signals. In recent years, a number of location-based service systems have been implemented or proposed for wireless networks. Such systems generally involve determining location information for a wireless station and processing the location information to provide an output desired for a particular application.

Examples of such existing or proposed applications include emergency or "911" applications, location dependent call billing, cell-to-cell handoff and vehicle tracking. In 911 applications, the location of a wireless station is determined when the station is used to place an emergency call. The location is then transmitted to a local emergency dispatcher to assist in responding to the call. In typical location dependent call billing applications, the location of a wireless station is determined, for example, upon placing or receiving a call. This location is then transmitted to a billing system that determines an appropriate billing value based on the location of the wireless station. In handoff applications, wireless location is determined in order to coordinate handoff of call handling between network cells. Vehicle tracking applications are used, for example, to track the location of stolen vehicles. In this regard, the location of a car phone or the like in a stolen vehicle can be transmitted to the appropriate authorities to assist in recovering the vehicle.

From the foregoing, it will be appreciated that location-based service systems involve location finding equipment (LFE) and location-related applications. To some extent, the LFEs and applications have developed independently. In this regard, a number of types of LFEs exist and/or are in development. These include so-called angle of arrival (AOA) time difference of arrival (TDOA), handset global positioning system (GPS) and the use of cell/sector location. The types of equipment employed and the nature of the information received from such equipment vary in a number of ways. First, some of these equipment types, like GPS, are wireless station-based whereas others are "ground-based," usually infrastructure-based. Some can determine a wireless station's location at any time via a polling process, some require that the station be transmitting on the reverse traffic channel (voice channel), and others can only determine location at call origination, termination, and perhaps registration. Moreover, the accuracy with which location can be determined varies significantly from case to case. Accordingly, the outputs from the various LFE's vary in a number of ways including data format, accuracy and timeliness.

The nature of the information desired for particular applications also varies. For example, for certain applications such as 911, accuracy and timeliness are important. For the applications such as vehicle tracking, continuous or frequent monitoring independent of call placement is a significant consideration. For other applications, such as call billing, location determination at call initiation and call termination or during handoff is generally sufficient.

Heretofore, developers have generally attempted to match available LFEs to particular applications in order to obtain the location information required by the application. This has not always resulted in the best use of available LFE resources for particular applications. Moreover, applications designed to work with a particular LFE can be disabled when information from that LFE is unavailable, e.g., due to limited coverage areas, malfunctions or local conditions interfering with a particular LFE modality. In addition, the conventional query and response mode of operation between applications and the associated LFEs has resulted in the use by applications of LFE dependent data formats, LFE limited data contents, and single LFE input location determinations.

BRIEF SUMMARY OF THE INVENTION

The present invention generally relates to managing the provisioning of location information on a mobile communications unit. A first aspect of the present invention is embodied in a method for providing location information on a mobile communications unit (e.g., wireless telephones, pagers, data terminals) of a mobile communications system (e.g., a wireless communications network). The method generally includes the step of determining at least the general location of a particular mobile communications unit. This information is then used to determine if any of a plurality of position determination equipment sites may be utilized to provide location information on this particular mobile communications unit.

Various refinements exist of the features noted in relation to the subject first aspect of the present invention. Further features may also be incorporated in the subject first aspect of the present invention as well. These refinements and additional features may exist individually or in any combination. The mobile communications system may include a plurality of cells. Each of these cells may encompass a certain geographical area. Typically when the mobile communications unit is being powered or is in an "on" condition, one or more signals will be exchanged on some basis (e.g., intermittently, periodically) between the mobile communications unit and the cell site equipment (e.g., one or more of a transmitter, receiver, transceiver, or antenna(s)) of the cell in which the mobile communications unit is then physically located. It may be possible for the mobile communications unit to be in this type of communication with multiple cells. Therefore, determining which cell(s) the mobile communications unit is currently communicating with in the above-noted manner may be used to define the general location of the mobile communications unit in accordance with the subject first aspect. That is, the "general location" of the mobile communications unit in accordance with the first aspect may correspond with the area of each of the cells which are in communication with the mobile communications unit in the above-noted manner. Where a cell includes a plurality of cell sectors, this same general technique may be utilized to determine which cell sector(s) is in communication with the mobile communications unit in the above-noted manner.

Another way of conceptualizing the "general location" associated with the subject first aspect is that it encompasses a first area. Knowledge of the geographical description of this first area may be used as a basis for determining which position determination equipment site, if any, includes a coverage area which at least overlaps with this first area.

The determination of which position determination equipment site, if any, would be able to provide location information on a mobile communications unit in accordance with the subject first aspect may entail consulting a database or other appropriate data storage structure having information on these position determination equipment sites. Various types of information may be stored on each position determination equipment site within this database. There will typically be an identifier of sorts which is unique to each particular position determination equipment site, and this information will typically be stored in the noted database. All other information relating to a particular position determination equipment site will then typically be stored in relation to or in association with its corresponding identifier.

Additional information which facilitates the determination of whether a position determination equipment site is available or appropriate for providing location information on a particular mobile communications unit is the geographical description of the coverage area for the particular position determination equipment site. This geographical description of the coverage area may be defined by the physical location of the position determination equipment site (e.g., a latitude and longitude coordinate) and some type of specified function (e.g. an equation for an area of a circle and which includes the relevant radius/diameter). Other ways of defining this geographical description may be implemented as well, such as by providing geographical coordinates which define the perimeter of the coverage area. In any case, knowledge of the general location of the mobile communications unit allows the database to be consulted to determine if the coverage area of any position determination equipment site includes at least part of, or more preferably encompasses, this general location.

Another way in which the first aspect of the present invention may be implemented is to store information on all of the position determination equipment sites that are available for providing location information for a mobile communications unit when within a particular cell or cell sector. Information on position determination equipment sites of this type can be stored for one or more cells and/or cell sectors within the mobile communications network, and more preferably for each of these cells or cell sectors. This may be implemented by one or more appropriately configured databases where each "record" in the database could be on a particular cell or cell sector, and which could then include at least an identification of those position determination equipment sites that are associated with the subject cell or cell sector (e.g., a server address). As noted above, the cell/cell sector of the subject mobile communications unit may be determined such that this database may be consulted to determine which position equipment sites, if any, would be available for providing location information on the mobile communications unit at issue.

Information may also be stored on one or more, and preferably each of, the mobile communications units that are part of the mobile communications network. A database or database structure may be used for this purpose as well. Information that may be stored on a mobile communications unit specific basis and that may be useful in implementing the first aspect is whether or not a particular mobile communications unit has handset-based location finding capabilities, such as GPS. The first aspect of the invention could then be adapted to first determine if the mobile communications unit for which location information is desired has handset-based location finding capabilities, and to consult the cell/position determination equipment site database only if the mobile communications unit of interest does not have handset-based location finding capabilities. This protocol could be reversed whereby the handset-based location finding capabilities of the subject mobile communications unit would only be evaluated if the determination of the general location of the subject mobile communications unit first led to a determination that no position determination equipment site was available for providing the desired location information.

Location information on a mobile communications unit may be requested by one or more location-based systems or applications. Requests for location information may be directed to a location information management system or location manager which executes the functionality of the subject first aspect. Although the location-based applications may be part of or interface with the mobile communications system in at least some manner, the first aspect contemplates that these location-based applications may be in direct communication with this location information management system as well. That is, any way of operatively interconnecting the location information management system and these location-based applications may be utilized in relation to the subject first aspect. In any case, the request for location information on a particular mobile communications unit will be relayed by the location information management system to one or more position determination equipment sites only if the location information management system associated with the first aspect first determines that each such position determination equipment site will be able to actually provide the desired location information. That is, the location information management system associated with the first aspect will not invoke a request for location information to a particular position determination equipment site unless the location information management system first determines that the position determination equipment site will be able to provide the desired location information on the subject mobile communications unit. Consider the case where there are first, second, and third position determination equipment sites, and where the mobile communications unit is physically located within the coverage area of only the first position determination equipment site. In accordance with the foregoing, a request for location information will be invoked only in relation to the first position determination equipment site and not the second or third position determination equipment sites. Related to the foregoing, any location information management system associated with the first aspect of the present invention may be configured so as to invoke a request to a particular mobile communications unit for handset-based location information only if any such location information management system first determines that this particular mobile communications unit does indeed have handset-based location finding capabilities.

The request for location information on a particular mobile communications unit in association with the first aspect may include one or more requirements or prerequisites relating to the desired location information. This may be characterized as a "quality of service negotiation." Each of these requirements may be evaluated in accordance with the subject first aspect of the present invention in relation to determining if any of the position determination equipment sites will be able to provide the location information on the mobile communications unit in accordance with the specified requirements. For instance, the request may include a time limit for receiving the location information on a given mobile communications unit. If a particular position determination equipment site cannot make the location determination within this time limit, a request for location information will not be invoked to this particular position determination equipment site. An acceptable uncertainty associated with the location information may also be included with a request for location information. For instance, a particular request may provide that the location information must be within ±10 feet. If a particular position determination equipment site cannot provide location information on a particular mobile communications unit with this degree of accuracy, a request for location information on the particular mobile communications unit will not be invoked to this particular position determination equipment site. Another requirement which may be provided along with a request for location information on a particular mobile communications unit is an acceptable cost or price for receiving this location information, and including in the form of a "not to exceed" amount which is specified. If a particular position determination equipment site cannot provide location information on the particular mobile communications unit within the financial constraints imposed by the request, a request for location information on this mobile communications unit will not be invoked to this particular position determination equipment site. Another factor that may be specified in relation to a request for location information is the "age" of the location information. In this case, the first aspect may utilize a database of the like which stores the last known location of at least one of, and more preferably each of, the mobile communications units that are part of the mobile communications network. The first aspect may then be adapted to first consult this information source to determine if the location information that is stored on the mobile communications unit at issue satisfies the corresponding request, and to thereafter proceed with a handset-based position determination evaluation or other position determination equipment site (e.g., network-based) evaluation only if the most recent and stored location information does not satisfy the outstanding request.

Location information on a particular mobile communications unit may be provided to the designated recipient(s) in a number of manners in relation to the subject first aspect of the present invention. Consider the case where multiple position determination equipment sites have first been determined to be available or appropriate for providing location information on a particular mobile communications unit (i.e., multiple position determination equipment sites satisfy all of the requirements associated with the request for location information on a particular mobile communications unit). One option would be to provide the location information to the designated recipient(s) from only one of these position determination equipment sites. This could be random or location information on a particular mobile communications unit could be invoked to the "best" position determination equipment site. Another option would be to provide the location information to the designated recipient(s) from each of these position determination equipment sites. Still another option would be utilize fusion principles or the like where at least two of the position determination equipment sites are each utilized in the derivation of the final location information (e.g., to combine the location information from two or more position determination sites in some maimer to provide a single result).

A second aspect of the present invention is directed toward providing location information on a mobile communications unit of a mobile communications system. A request for location information on a particular mobile communications unit is directed toward a mobile communications unit location information management system. A response to this request is directed toward the requestor (e.g., a particular location-based service system or application). In the case of the subject second aspect, this response is the location information on the desired mobile communications unit. However, this location information must have been derived in a certain manner in accordance with the second aspect. Generally, the location information must be from at least one position determination equipment site which was first determined by the mobile communications unit location information management system to be appropriate for providing the desired location information before the mobile communications unit location information management system actually invoked a request to this particular position determination equipment site for the location information on the particular mobile communications unit.

BRIEF DESCRIPTION OF THE SEVERAL VIEWS OF THE DRAWING

FIG. 12A is one embodiment of a position determination equipment site database structure which may be utilized by the location information management system of FIG. 10.

DETAILED DESCRIPTION OF THE INVENTION

Figure 1:
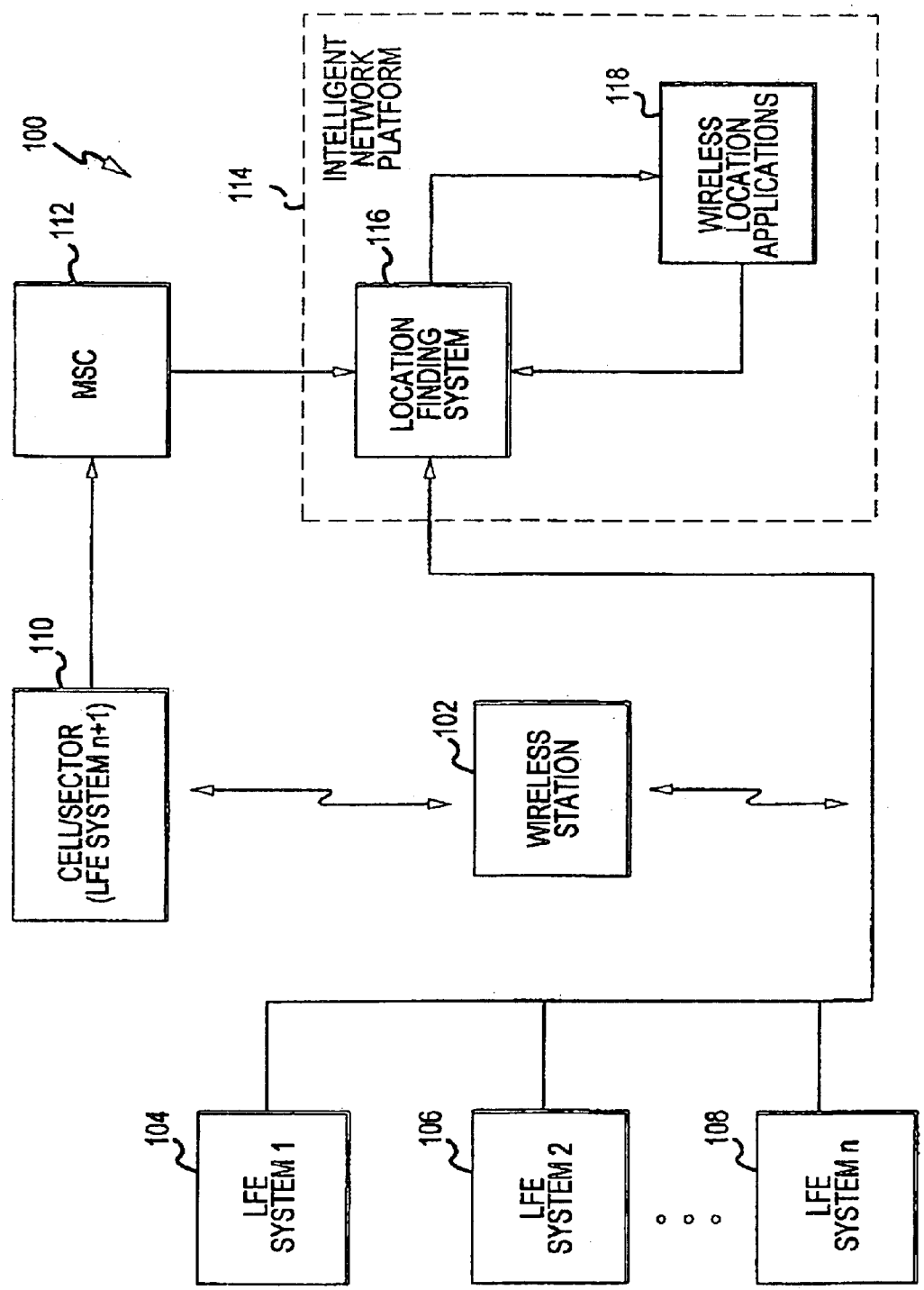
FIG. 1 is a schematic diagram of a wireless network implementing a location information management system in accordance with one or more aspects of the present invention.

A number of aspects of the present invention, other than those set forth in the Summary of the Invention, will be addressed before discussing the various embodiment disclosed in the accompanying drawings. A third aspect of the present invention is directed to a method and apparatus for using multiple PDE/LFE inputs to enhance the location information made available to wireless location-based applications. Herein, any reference to a LFE (location finding equipment) encompasses a PDE (position determination equipment), and vice versa. This third aspect allows wireless location-based applications access to information based inputs from LFEs of different types, thereby enhancing the timeliness, accuracy and/or reliability of the requested location information. Moreover, in accordance with the subject third aspect of the present invention, applications are independent of particular LFEs and can access location information from various LFE sources without requiring specific adaptations, data formats, or indeed knowledge of the LFE sources employed, in order to access and use such location information. By virtue of such independence, new location finding technologies can be readily deployed and existing applications can exploit such new technologies without compatibility issues. The third aspect of the present invention also allows multiple LFE inputs, from one or more LFEs, to be used to allow for wireless station tracking and reduced location uncertainty.

According to one embodiment of the subject third aspect of the present invention, a method is provided for using multiple (i.e., two or more) LFEs to support a wireless location application. The method involves receiving first and second inputs from first and second LFEs, storing location information based on the inputs in memory, receiving a location request regarding a wireless station from a wireless location application, selectively retrieving the location information from memory, and outputting a response to the location request to wireless location application.

The first and second LFEs preferably may employ different location finding technologies, e.g, GPS, AOA, TDOA, and cell/sector technologies. The stored location information preferably includes at least location information and corresponding time information for particular wireless stations, and may further include location uncertainty information, travel speed information and travel direction information. In response to the location request from the wireless location application, location information may be retrieved from memory or, alternatively, one or more of the LFEs may be prompted to obtain location information. In this regard, the location request may include a specification regarding the desired location information or "quality of service", for example, indicating how recent or how accurate the information should be. If the memory includes information conforming to the specification, then such information is retrieved and output to the requesting application. Otherwise, appropriate information may be obtained by prompting one or more LFEs to locate the wireless station of interest.

In accordance with another embodiment of the subject third aspect of the present invention, a processing system is interposed between the LFEs and the wireless location applications such that the applications can access location information in a manner that is independent of the location finding technology employed by the LFEs. The corresponding process implemented by the processing system involves: receiving LFE dependent location data (i.e., location data having a content and/or format dependent on the location finding technology employed) from multiple LFEs receiving a location request from a wireless location application seeking LFE independent location data (i.e., location data having a content and format independent of any particular location finding technology) and responding to the location request based on LFE dependent location data. The process implemented by the processing system may further involve generating and storing LFE independent location data based on the LFE dependent data. The processing system may be resident on the location finding controllers associated with each LFE, on a separate platform and/or the processing system functionality may be distributed over multiple platforms.

According to a still further embodiment of the subject third aspect, multiple LFE inputs, are utilized to make a location determination regarding a wireless station. The corresponding method involves the steps of receiving a first location input from a first LFE including first location information and first uncertainty information, receiving a second location input from a second LFE including second location information and second uncertainty information and combining the first and second location inputs to provide a combined location input including combined location information and uncertainty information based on the first and second inputs. Preferably, the first and second inputs include raw location and uncertainty information obtained from LFE measurements prior to aggregation and related processing. One or both of the first and second inputs may constitute partial information, insufficient on its own to yield a location and uncertainty regarding the wireless station within the requirements of the wireless location application. For example, in the case of LFEs that determine location based on readings obtained relative to two or more cell sites, a reading from one of the cell sites may be used in conjunction with other location information, e.g., cell sector information, to make a location determination.

According to another embodiment of the subject third aspect of the present invention, multiple LFE inputs, obtained at different times from the same or different LFEs, are utilized to derive tracking information such as for obtaining improved location determination accuracy. The associated method includes the steps of receiving a first LFE input including first location information and first corresponding time information for a particular wireless station, receiving a second LFE input including second location information and second time information for the wireless station, and using the first and second inputs to derive tracking information for the wireless station. The tracking information preferably includes information regarding the mobile station's speed of travel and direction of travel. This tracking information can be used in conjunction with subsequent LFE inputs for the wireless station to improve location determination accuracy and can also be used to interpolate wireless station location between location determinations, or to project future wireless station locations as may be desired for some applications. It will be appreciated that this tracking function and other functions are facilitated by the provision of a system for receiving inputs from one or more LFEs, standardizing such inputs with regard to data content and format, and storing such information. In particular, such standardized and stored information can be readily analyzed to yield derivative information regarding wireless station position as well as statistical information for wireless stations of interest in the service area.

A system constructed in accordance with another embodiment of the subject third aspect of the present invention includes an input facility for receiving inputs from multiple LFEs, a memory such as a cache for storing information from the LFE inputs (e.g., a wireless station identification, a location, a time associated with that location, an uncertainty for that location, and travel speed and bearing), an interface for receiving location requests from wireless location applications and providing responses to such requests, and a processing subsystem for processing the LFE inputs and location requests. The apparatus may also include a facility for prompting LFEs to make location measurements in response to location requests. Among other things, the processing subsystem may convert the LFE inputs into a standard format, direct storage of data in the memory, derive tracking or other derivative information from multiple inputs, analyzing stored information relative to received location requests to determine whether the stored information includes information responsive to the requests and selectively directing the LFEs to make location measurements. The system may be resident on a single or multiple platform and the functionality may be spread among multiple applications.

In the following description, particular embodiments and implementations of the above-noted aspects of the present invention are set forth in the context of a telecommunications network. It will be appreciated however, that various aspects of the invention are more broadly applicable to other location based services environments.

Referring to FIG. 1, an wireless telecommunications network implementing one or more aspects of the present invention is generally identified by the reference numeral 100. Generally, the network includes a mobile switching center (MSC) 112 for use in routing wireless communications to or from wireless stations 102, a network platform 114 that may or may not be associated with the MSC 112 for implementing a variety of subscriber or network service functions, but which at least is in communication therewith, a variety of location finding equipment (LFE) systems 104, 106, and 108, a cell site equipment system 110, and an IWF (interworking function) system 122. In the illustrated embodiment, the network platform 114 is used to run a location information management system or Location Manager (LM) 116 in accordance with the present invention and a number of wireless location applications 118. Although the illustrated location manager 116 and wireless location applications 118 are illustrated as being resident on the network platform 114, it will be appreciated that the elements 116 and 118 may be located elsewhere in the network 100, may be resident on the same platform or on separate platforms within the network 100, or the functionality of each of these elements 116 and 118 may be spread over multiple platforms (e.g., individual applications may be on their own platform, including the LM 116). In addition, other applications not depicted in FIG. 1 may be resident on the platform 114, on one or more other platforms within the network 100, or both.

As shown in FIG. 1, multiple LFE systems 104, 106, and 108 may be associated with the network 100. These LFE systems 104, 106, and 108 may employ any of a variety of location finding technologies such as AOA, TDOA, GPS, EOTD (enhanced observed time difference), TOA (time of arrival)-assisted GPS, and cell/sector technologies, and the various system 104, 106, and 108 may be the same as or different from one another. It will be appreciated that the nature of the data obtained from the LFE systems 104, 106, and 108, as well as the path by which the data is transmitted varies depending on the type of LFE employed, and the ability to accommodate a variety of LFEs is an important advantage of one or more aspects of the present invention.

Some types of LFEs include LFE equipment in the handset. Examples include certain GPS and TDOA systems. In such cases, location information may be encoded into signals transmitted from the handset to a cell site or other receiver, and the information may then be transferred to the platform 114 via the MSC 112 or otherwise. Other LFE systems, i.e., embedded systems use equipment associated with individual cell sites such as specialized antennae to make location determinations such as by triangulation and, again, the resulting location information may be transferred to the platform 114 via the MSC 112 or otherwise. Still other LFE systems employ a network of dedicated LFE equipment that is overlayed or integrated relative to the wireless network. Such systems may communicate location information to the platform 114 independent of the MSC 112 and network cell site equipment. In addition, some LFE technologies can be implemented via equipment resident in the handset, in cell sites or other network locations and/or in dedicated LFE sites such that the data pathway of the location information may vary even for a given LFE technology.

Three of the illustrated systems 104, 106 and 108 operate separate from the MSC 112. For example, such systems may include network based systems AOA and TDOA systems and external systems such as GPS. Generally, the illustrated network based system such as AOA and TDOA systems determine the location of a wireless station 102 based on communications between the wireless station and the cell site equipment of multiple cell sites. For example, and as will be described in more detail below, such systems may receive information concerning a directional bearing of the wireless station 102 or a distance of the wireless station 102 relative to each of multiple cell sites. Based on such information, the location of the wireless station 102 can be determined by triangulation or similar geometric/mathematic techniques. External systems such as GPS systems, determine the wireless station location relative to an external system. In the case of GPS systems, the wireless station 102 is typically provided with a GPS receiver for determining geographic position relative to the GPS satellite constellation. This location information is then transmitted across an air interface to the network 100.

The network 100 further includes a cell site equipment system 110 for communicating with the wireless station 102. In this regard, the cell site equipment system 100 may include three or more directional antennas for communicating with wireless stations within subsections of the cell area. These directional antennas can be used to identify the subsection of a cell where the wireless station 102 is located. In addition, ranging information obtained from signal timing information may be obtained to identify a radius range from the cell site equipment where the wireless station 102 is located, thereby yielding a wireless station location in terms of a range of angles and a range of radii relative to the cell site equipment. This cell/sector location information can be transmitted to the LM 116 via the MSC 112 or possibly via other network elements or structure. Therefore, the cell site equipment system 110 may also be characterized as an LFE. The cell site equipment system 110 may also communicate with the wireless location applications 118, such as through the MSC 112 and the IWF system 122, or directly through the IWF system 122 (i.e., bypassing the MSC 112).

As shown, the LM 116 receives location information from the various LFE systems 104, 106, 108 and 110. The nature of such information and handling of such information is described in more detail below. Generally, however, such information is processed by the LM 116 to provide location outputs for use by any of various wireless location applications 118 in response to location requests from the application 118. Such applications may include any wireless location services applications such as 911, location information delivery (e.g., closest restaurant), vehicle tracking and location-based billing programs.

Figure 2:
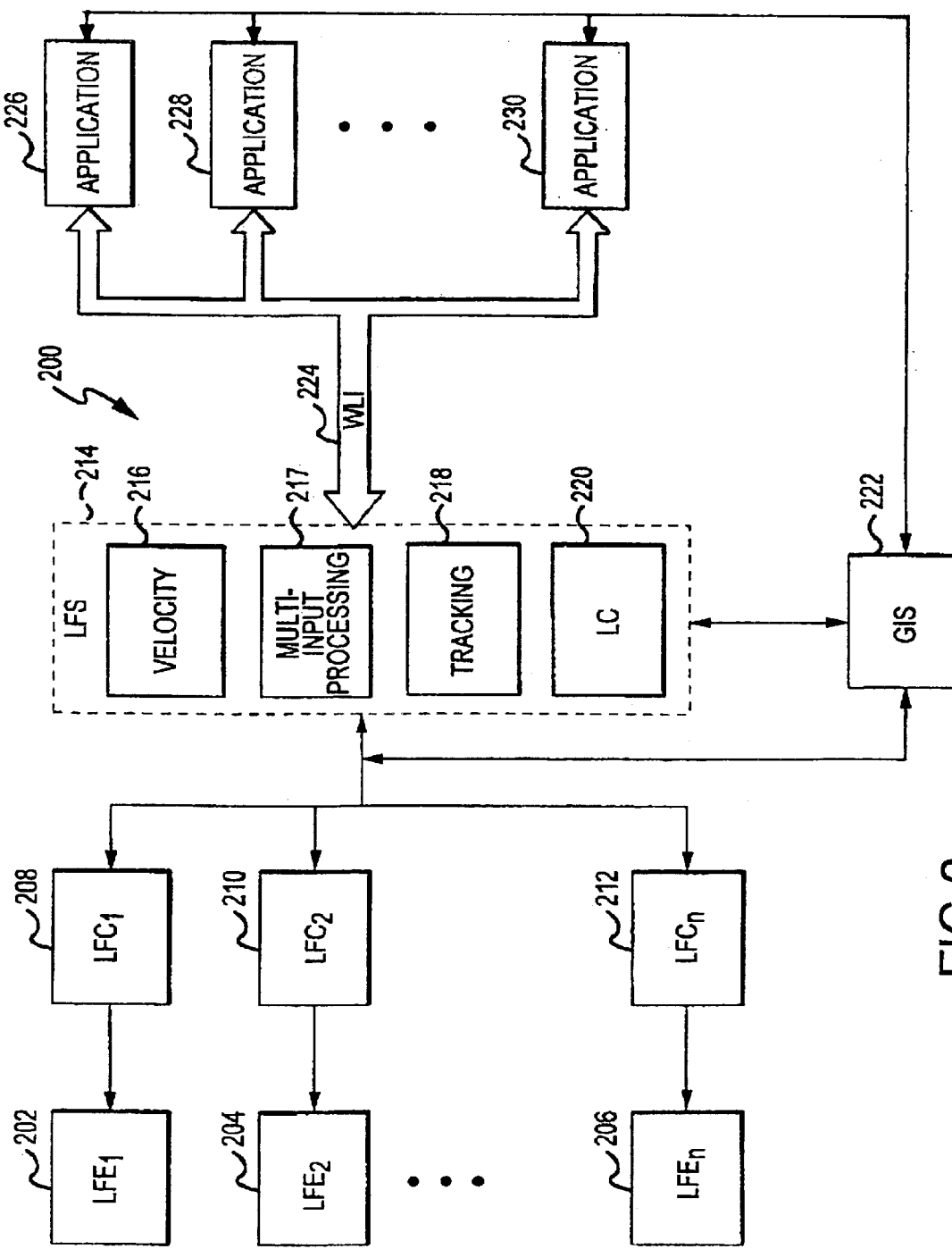
FIG. 2 is a schematic diagram illustrating a wireless location-based services system in accordance with one or more aspects of the present invention.

FIG. 2 illustrates a location-based services system 200 in accordance with one or more aspects of the present invention. An important aspect of one or more aspects of the present invention relates to the operation of the LM 214 to receive inputs from multiple LFEs 202, 204 and 206 and provide location outputs to multiple applications 226, 228 and 230. In accordance with one or more aspects of the present invention, the LFEs 202, 204 and 206 may be based on different technologies, and may therefore provide different types of location information, in different data formats, with different accuracies based on different signals.

Figure 3A:
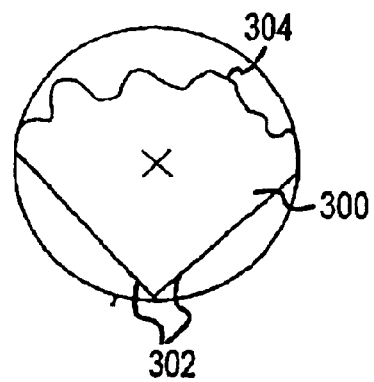
FIGS. 3a–3e illustrate various location finding technologies that may be utilized in the context of the one or more aspects of the present invention.

A number of different location finding technologies are depicted in FIGS. 3a–3d for purposes of illustration. FIG. 3a generally shows the coverage area 300 of a cell sector. As noted above, the cell site equipment for a particular cell of a wireless telecommunications system may include a number, e.g., three or more, of directional antennas. Each antenna thus covers an angular range relative to the cell site bounded by sides 302. In the case of a three sector cell, each antenna may cover about 120°–150° relative to the cell site. In addition the coverage range for the antenna defines an outer perimeter 304 of the coverage area 300. As shown, the range varies with respect to angle defining a somewhat jagged outer perimeter 304. Accordingly, the actual uncertainty regarding the location of a wireless station located in the illustrated cell sector is defined by the coverage area 300. The location determination output from a cell/sector LFE is therefore effectively defined by the coordinates of the coverage area 300.

Figure 3B:
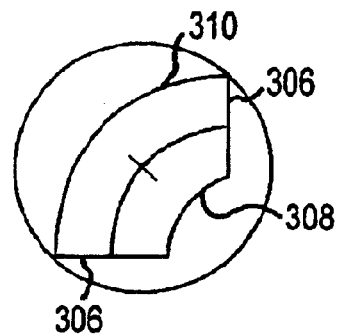

FIG. 3b depicts a TOA based LFE. In this case, the wireless station's range from a cell sector antenna is determined, based on time of signal arrival or signal transit time to within a radius range, e.g., about 1000 meters. Accordingly, the wireless station's location can be determined to be within an area bounded by sides 306 (based on the angular range of the cell sector antenna) and inner 308 and outer 310 arcs (defined by the ranging uncertainty). The output from a TOA based LFE is effectively defined by the coordinates of the sides 306 and the axes 308 and 310.

Figure 3C:
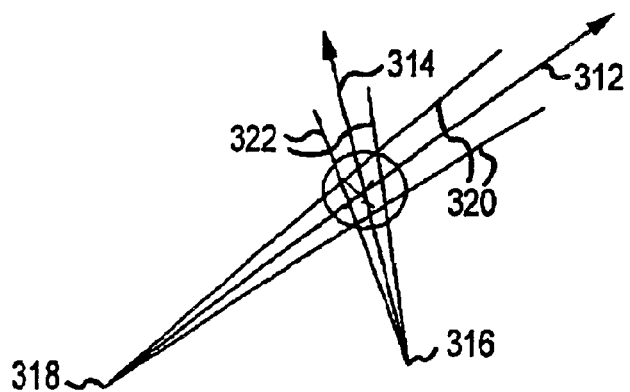

An AOA based LFE is generally illustrated in FIG. 3c. AOA based LFEs determine the location of a wireless station based on the angle of arrival of signals, generally indicated by rays 312 and 314, from the wireless station as measured by two or more cell sites 316 and 318. Each angle measurement has an angular uncertainty generally indicated by line segments 320 and 322. Consequently, the uncertainty region for a given location determination is defined by a polygon having 2n sides, where n is the number of cell sites 316 and 318 involved in the measurement.

Figure 3D:
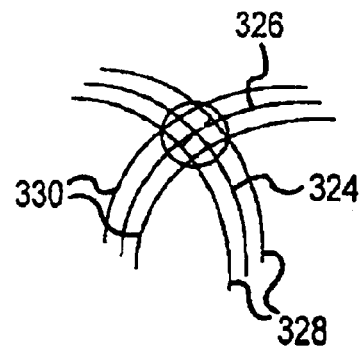

FIG. 3d illustrates a TDOA based LFE although the illustrated system is cell site based, the TDOA system may alternatively be handset based. In TDOA systems, multiple cell sites measure the time of arrival of signals from a wireless station. Based on such measurements, each cell site can provide information regarding wireless station location in terms of a hyperbola 324 or 326 and an uncertainty, generally indicated by segments 328 and 330. The resulting uncertainty region is defined by a multi-sided region (where each wall is curved) having 2n walls, where n is the number of cell sites involved in the determination.

Figure 3E:
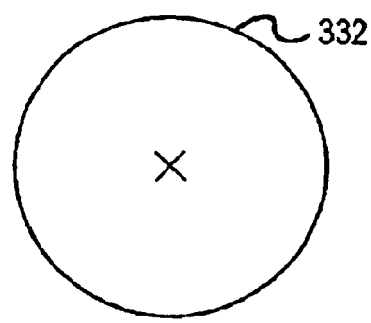

FIG. 3e illustrates a GPS based LFE. In GPS systems, the wireless station includes a GPS transceiver for receiving signals indicating the wireless station's location relative to multiple satellites in the GPS constellation. Based on these signals, the geographic coordinates of the wireless station's location is determined to an accuracy of perhaps 20 meters as generally indicated by circle 332. This information is then transmitted to the wireless network across an air interface.

Referring again to FIG. 2, each of the LFEs 202, 204 or 206 outputs location information to its respective LFC 208, 210 or 212. The LFCs 208, 210, 212 could be part of the LFEs 202, 204, 206, could be separate therefrom as shown in FIG. 2, or could be part of the LM 214. In any case, the nature of this "raw" LFE output to the LFC depends in part on the type of LFE involved. For example, in the case of a cell sector system the output may be a sector identifier or coordinates; in the case of a TOA system, the output may be a sector identifier or coordinates and a radius; in an AOA system the output may be angular measurements and corresponding cell site identifiers/coordinates; in TDOA systems the output may define multiple hyperbolae; and in GPS systems the output may be geographic coordinates.

The LFCs 208, 210 and 212 collect and aggregate the "raw" location into a standard format which is then sent to the location cache or location cache storage (LC) 220 of the LM 214 for storage. Aggregation involves using the raw data to determine a wireless station location and uncertainty. For some LFE systems, such as GPS systems, this process is simple because location coordinates are reported and the uncertainty is known. For other LFE systems, aggregation is more involved. For example, in the case of TDOA, aggregation may involve receiving multiple hyperbola definitions and using these definitions to define a wireless station location and a multi-sided uncertainty region. The LFCs 208, 210 and 212 may be provided by the LFE vendors or their functionality may be incorporated into a subsystem of the LM 214.

In the context of one or more aspects of the present invention, it is useful to express the location information in a standard format. Accordingly, the LFCs 208, 210 and 212 or a cooperating subsystem of the LM 214 associated with the LC 220, may implement a conversion facility for converting the determined (processed) location information of the LFCs 208, 210 and 212 into standardized location information expressed, for example, as geographical location coordinates and a region of uncertainty. The uncertainty region may be of any shape (e.g., polygonal) depending, for example, on the nature of the LFE(s) employed. Once such type of uncertainty region is a circular region that can be characterized by an uncertainty radius. In the illustrated embodiment, two dimensional location coordinates are defined (e.g., latitude and longitude) together with an uncertainty radius applied relative to the location coordinates. It will be appreciated that the standard format may allow for altitude coordinates, non-circular uncertainty regions and other parameters.

Referring again to FIGS. 3a–3e, examples of these coordinates and circular uncertainty regions are graphically depicted. In particular, in each case, a location "L" and standardized uncertainty region "C" are geometrically defined such that the standardized uncertainty region C circumscribes the actual uncertainty region associated with that location finding technology. In this regard, the location L may be defined first (e.g., as the intersection of rays 312 and 314 in FIG. 3c) and then the minimum radius circle C may be defined to circumscribe the actual uncertainty region; the standardized uncertainty region C may be defined first (e.g., as the minimum radius circle required to circumscribe the actual uncertainty region) and then L be defined as the center of the circle C; or any other appropriate geometric solutions/approximations may be employed.

This standardized location information is then stored in a database in LC 220. Specifically, the location coordinates for a wireless station and corresponding uncertainties can be stored in a field, in a relational database, or can otherwise be indexed to a wireless station identifier, e.g., a cellular telephone Electronic Serial Number/Mobile Identification Number (ESN/MIN). The coordinates and uncertainty may be expressed in terms of any appropriate units. For example, the coordinates may be expressed as latitude and longitude values in units of $10^{-6}$ degrees and the uncertainty may be expressed in units of meters.

The stored, standardized information can be used to perform a number of multiple input analyses. Three examples of such facilities are generally indicated by the velocity 216, multi-input processing 217 and tracking 218 facilities of LM 214. The velocity facility 216 involves determining and storing speed information and direction (bearing) information for a wireless station based on multiple LFE inputs for the station. Because of the standardized format, such determinations can be easily made relative to inputs from the same or different LFEs 104, 106 and/or 108. The velocity information can be obtained based on knowledge of the change in position and the change in time (determined by way of the time stamps associated with the location information) and may be expressed in terms of latitudinal and longitudinal velocity components in units of meters per second, together with velocity uncertainty terms. The direction information can be directly obtained from the location information, or can be based on a ratio of the velocity components, using standard trigonometric principles. It will be appreciated that such speed and direction information may be useful for a variety of applications such as vehicle tracking.

The multi-input processing facility 217 can be used to improve location accuracy based on multiple inputs from the same or, more preferably, different LFEs 202, 204 and/or 206. That is, if two locations with two uncertainties can be obtained for a given wireless station at a given time, a reduced uncertainty can be calculated as the overlap of the two original uncertainties. A complicating factor is that the locations and uncertainties stored in the LC 220 for a given wireless station will typically not represent location determinations for the same time. Because wireless stations are generally mobile, an additional element of uncertainty is introduced.

The illustrated multi-input processing facility 217 takes time into account. This is accomplished by:

1. accessing the LC 220 to obtain two (or more) sets of location information for a given wireless station;
2. identifying a location, uncertainty and time for each set of information;
3. determining a time difference between the times of the information sets;
4. calculating an element of location uncertainty associated with the time difference; and
5. applying the calculated element of location uncertainty to the earlier location information to obtain time translated location information.

This time translated location information can then be compared to the later location information in an uncertainty overlap analysis, as described below, to obtain a reduced uncertainty.

Various processes can be employed to calculate the additional, time-related element of location uncertainty. A simple case involves assuming a maximum rate of travel. For example, a maximum rate of travel of 70 miles per hour may be assumed to account for travel of a mobile phone in a vehicle. The uncertainty associated with an earlier location determination may then be expanded by a value determined by multiplying the maximum rate of travel by the time difference between the two measurements to be compared. Different maximum travel rates may be assumed for different conditions, for example, a lower rate may be assumed for city locations than for suburban locations, a lower rate may be assumed for peak traffic periods, or a lower rate may be assumed for mobile stations that are not generally used on fast moving vehicles. Also, wireless station speed and direction information as described above or other tracking information as described below may be used to reduce the time-related element of uncertainty.

Figure 4:
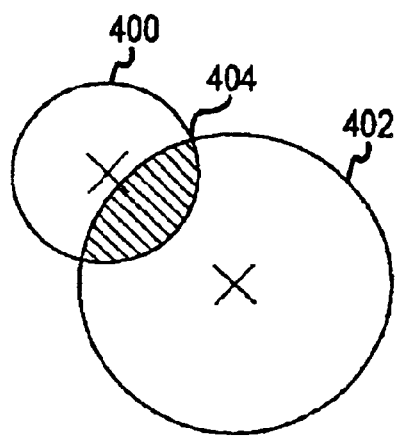
FIG. 4 is a graphical illustration of the use of multiple LFE inputs to reduce location uncertainty in accordance with one or more aspects of the present invention.

Once such a time translation process has been employed to normalize multiple LFE inputs relative to a given time, an uncertainty overlap analysis can be implemented. Such an analysis is graphically illustrated in FIGS. 4 and 5. Referring first to FIG. 4, the smaller circle represents a location and uncertainty associated with a later LFE input taken to be at time $t_1$. The larger circle 402 represents a location and uncertainty associated with a time translated location information based on an earlier LFE input taken to be at time $t_0$. Circle 402 is illustrated as having a larger uncertainty than circle 400 to account for the additional time and travel related element of uncertainty associated with the time translation. The shaded overlap area 404 represents the reduced uncertainty achieved by using multiple inputs. That is, statistically, if circle 400 represents a 95% confidence level regarding the position of the station at $t_1$ and circle 402 represents a nearly 95% confidence level regarding the position of the station at $t_1$, the position of the station can be determined to be in the shaded area 404 with a high level of confidence.

Figure 5:
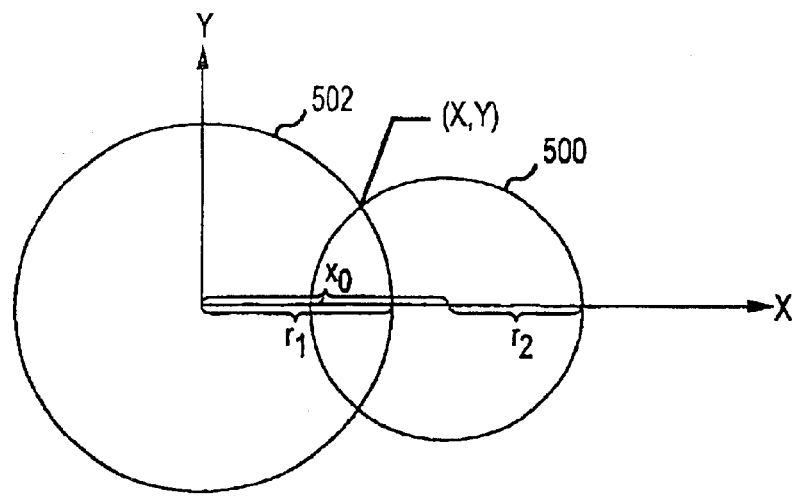
FIG. 5 is a graphical depiction of a location uncertainty analysis in accordance with one or more aspects of the present invention.

FIG. 5 illustrates a mathematical process for combining the original uncertainties to obtain a more accurate position and uncertainty. Mathematically, the problem is to compute the intersection of the circular uncertainty regions, and express the result as a location with an uncertainty (e.g., a circular uncertainty circumscribing the intersection region). To simplify the mathematics, the geometric arrangement of FIG. 4 is translated to provide a first axis (x in FIG. 5) that extends through the centerpoints of the circular uncertainty regions 500 and 502 (generally, the coordinates of the originally determined locations) and an orthogonal axis (y) intersecting the center of the larger (in this case later) circular uncertainty region 502. The mathematical equations for the boundaries of circular uncertainty regions 500 and 502 are:

$$x^2 + y^2 = r_1^2 \qquad (1)$$

$$(x-x_0)^2 + y^2 = r_2^2 \qquad (2)$$

It will be appreciated that the values of $r_1$, $r_2$ and $x_0$ are known as these are the uncertainty of the time translated information, the uncertainty of the later LFE input and the difference between $r_1$ and $r_2$, respectively. Equations (1) and (2) can then be simultaneously solved to obtain x and y, where x is the new location and y is the radius of the new uncertainty region. Finally, these values can be translated back into Earth coordinates. This mathematical analysis can be used for cases where $x \leq x_0$ and $x_0 \leq r_1 + r_2$. In other cases, the most recent or most accurate of the LFE inputs can be utilized.

The illustrated LM 214 also includes a tracking facility 218. Such tracking involves using historical information (at least two sets of location information) and using such information to reduce the uncertainty associated with current measurements. That is, by tracking movement of a wireless station, information can be obtained that is useful in analyzing the uncertainty of current measurements. In a simple case, where tracking information indicates that a wireless station is moving in a straight line (or otherwise on a definable course) or at a constant speed, then curve fitting techniques or other simple algorithms can be employed to obtain a degree of confidence concerning current location. Moreover, interpolation and extrapolation techniques can be employed to determine location at times between measurements or in the future. Such information may be useful to determine when a wireless station crossed or will cross a boundary as may be desired, for example, for location-based billing applications or network management applications (for handling hand-off between adjacent cells). It will thus be appreciated that the information stored in the LC 220 may include wireless station identifiers, locations, uncertainties, confidence levels, travel speeds, travel directions, times and other parameters. Data may be purged from the LC 220 upon reaching a certain age in order to remove visitor data and other unnecessary data.

The velocity facility 216, multi-input processing facility 217, and tracking facility 218 may use the raw information data transmitted from the LFEs 202, 204 and 206 to the LFCs 208, 210 and 212 in place of, or in addition to, the LFC outputs. For example, the multi-input processing facility 217 may use a hyperbola definition from a TDOA system in combination with an angle from an AOA system (or other combination of partial LFE outputs) if such combination yields an improved location accuracy or otherwise provides a suitable location determination. Similarly, it may be preferred to use the raw data for velocity or tracking calculations as such data is mathematically closer to the moving wireless station and may more accurately reflect station movement.

Referring again to FIG. 2, the illustrated system 200 includes a wireless location interface (WLI) 224 that allows wireless location applications 226, 228 and 230 to selectively access information stored in the LC 220 or prompt one or more of LFEs 202, 204 and/or 206 to initiate a location determination. The WLI 224 provides a standard format for submitting location requests to the LM 214 and receiving responses from the LM 214 independent of the location finding technology(ies) employed. In this manner, the applications can make use of the best or most appropriate location information available originating from any available LFE source without concern for LFE dependent data formats or compatibility issues. Moreover, new location finding technologies can be readily incorporated into the system 200 and used by the applications 226, 228 and 230 without significant accommodations for the existing applications 226, 228 and 230, as long as provision is made for providing data to the LC 220 in the form described above.

The WLI 224 of the illustrated implementation allows the applications to include a specification with a location request regarding the desired location information. For example, the specification may include one or more of the following: the timeliness of the location information (e.g., not older than [date stamp parameter]), the accuracy of the information (e.g., uncertainty not exceeding [uncertainty parameters]), confidence (confidence at least equal to [confidence parameter]). Alternatively, the request may specify the use of the most recent available information, most accurate available information, etc. In addition, the location request can specify whether the request is for one-time only location information or ongoing monitoring of a mobile station, whether the LM 214 should wait for the next available update or force a location determination, whether redundant or unnecessary updates should be filtered (e.g., do not send updates more often than once a minute or if wireless station has moved less than 50 meters), and what the priority of the request is. In this manner, ongoing monitoring may be employed, for example, by applications such as vehicle tracking and 911, and event triggered requests can be used for other applications such as location based billing. In each case, the desired location parameters can be specified.

Figure 6:
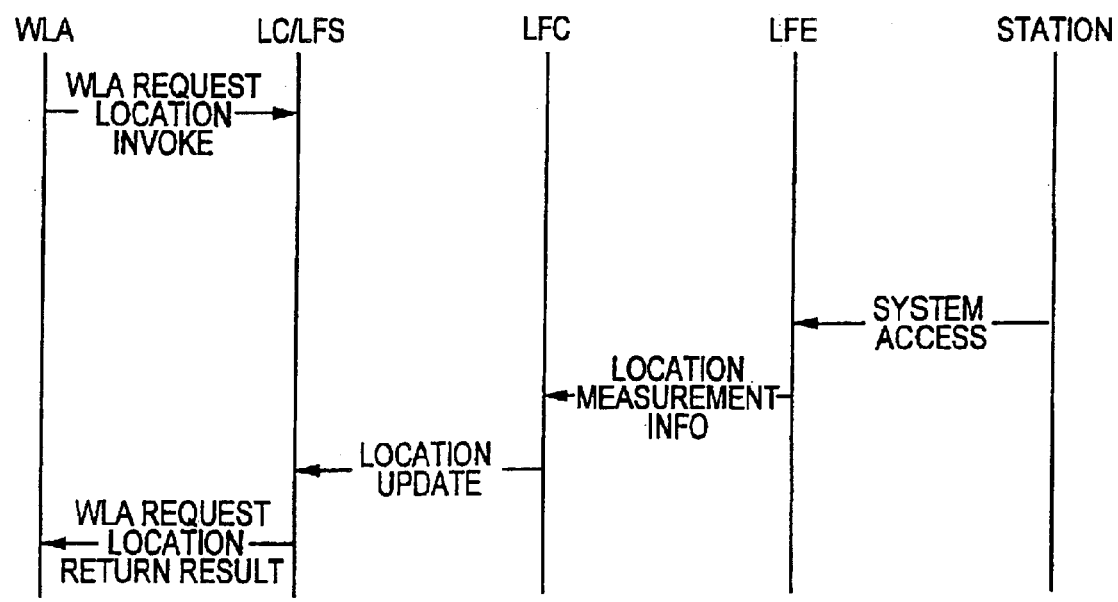
FIGS. 6–9 illustrate various wireless location interface signaling sequences in accordance with one or more aspects of the present invention.

FIGS. 6–9 show messaging sequences for various location request situations. Specifically, FIG. 6 shows a series of messages for a location request where the application waits for the next available location determination. The process is initiated by transmitting a WLARequestedLocationInvoke message from one of the WLAs to the LC. This message may include parameter fields for Wireless Station Identification, WLA Identification, Location Request Filter, Location Request Mode (check LC or force LFE location determination), Geographic Extremes (where to look for wireless station), Request Priority (processing priority relative to other pending requests) and Fallback Timeout (time that WLA will wait for a current location determination before accepting the information stored in the LC).

In the case of FIG. 6, where the WLA waits for the next available location determination, the next message may be a system access or other triggering signal from the wireless station to the LFE. In response, the LFC sends raw location measurement information to the LFE which, in turn, provides a location update to the LC. The LM then responds to the location request from the WLA with a WLARequestLocationReturnResult message. This message may include the following parameters: Geographic Location, Location Uncertainty, Location Determination Technology, Time Stamp, Velocity, Velocity Uncertainty, and Fallback Timeout Occurred Flag.

Figure 7:
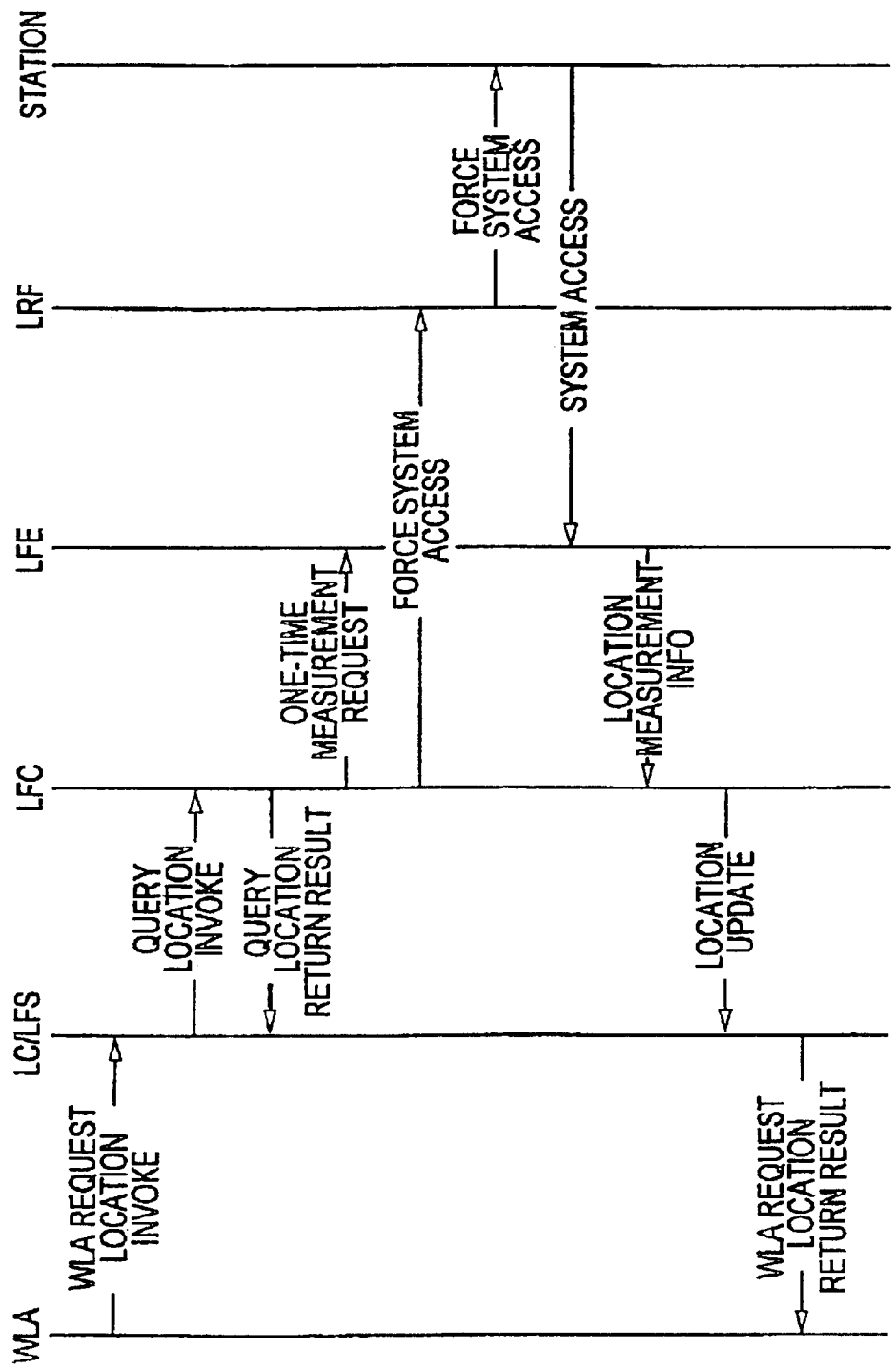

FIG. 7 illustrates a sequence of messages associated with a forced LFE access. The illustrated sequence is initiated by a WLARequestLocationInvoke as described above. In response, the LM transmits a QueryLocationInvoke message to the LFC to force an LFE determination, and the LFC confirms receipt of this message with a QueryLocationReturnResult message. The parameters of the QueryLocationInvoke message may include Wireless Station ID, Geographic Extremes and Measurement Priority (relative to other pending measurement requests). The LFC then sends a One-time Measurement Request message to the LFE to instruct the LFE to obtain location information for the wireless station of interest. In cases where ongoing monitoring is desired, this message may be sent repeatedly or periodically as indicated by multiple arrowheads in the Figure. In order to obtain a location measurement, it is generally necessary to cause the wireless station to transmit an RF signal for detection by the LFE or to communicate location data to the wireless network. This can be achieved by conducting a polling process using an LRF which requests all wireless stations to register. In this regard, the LFC issues a Force System Access message to the LRF which, in turn, transmits the Force System Access message to the wireless station. In response, a system access signal is transmitted by the wireless station and detected by the LFE. The LFE then transmits Location Measurement Information to the LFC. This may be repeated in the case of ongoing monitoring. The LFC provides a Location Update to the LC and, finally, the LM transmits a WLARequestLocationReturnResult as described above to the WLA.

Figure 8:
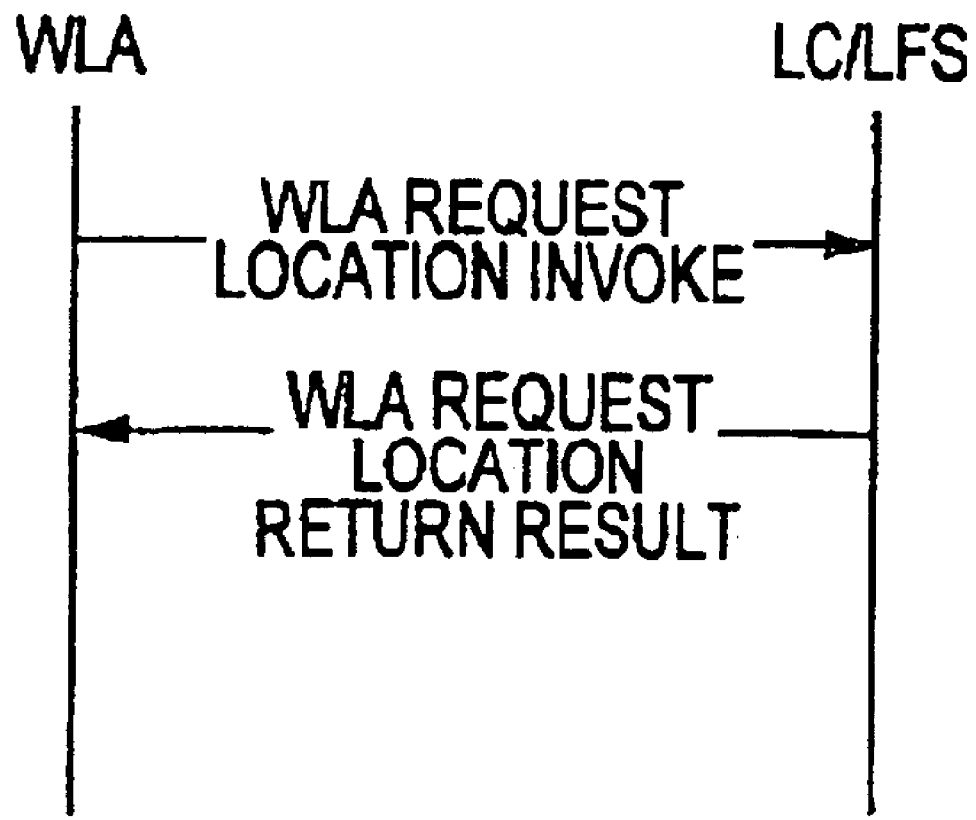

FIG. 8 represents the case where a location request can be responded to based on the data stored in the LC. This occurs, for example, where the cached data satisfies the request specification or the request specifically seeks data from the LC. Very simply, the illustrated message sequence involves transmission of a WLARequestLocationInvoke message from the WLA to the LM and a responsive WLARequestLocationReturnResult. It will be appreciated that this case allows for a very fast response. Moreover, it is anticipated that the cached data will be sufficient in many cases for many WLAs.

Figure 9:
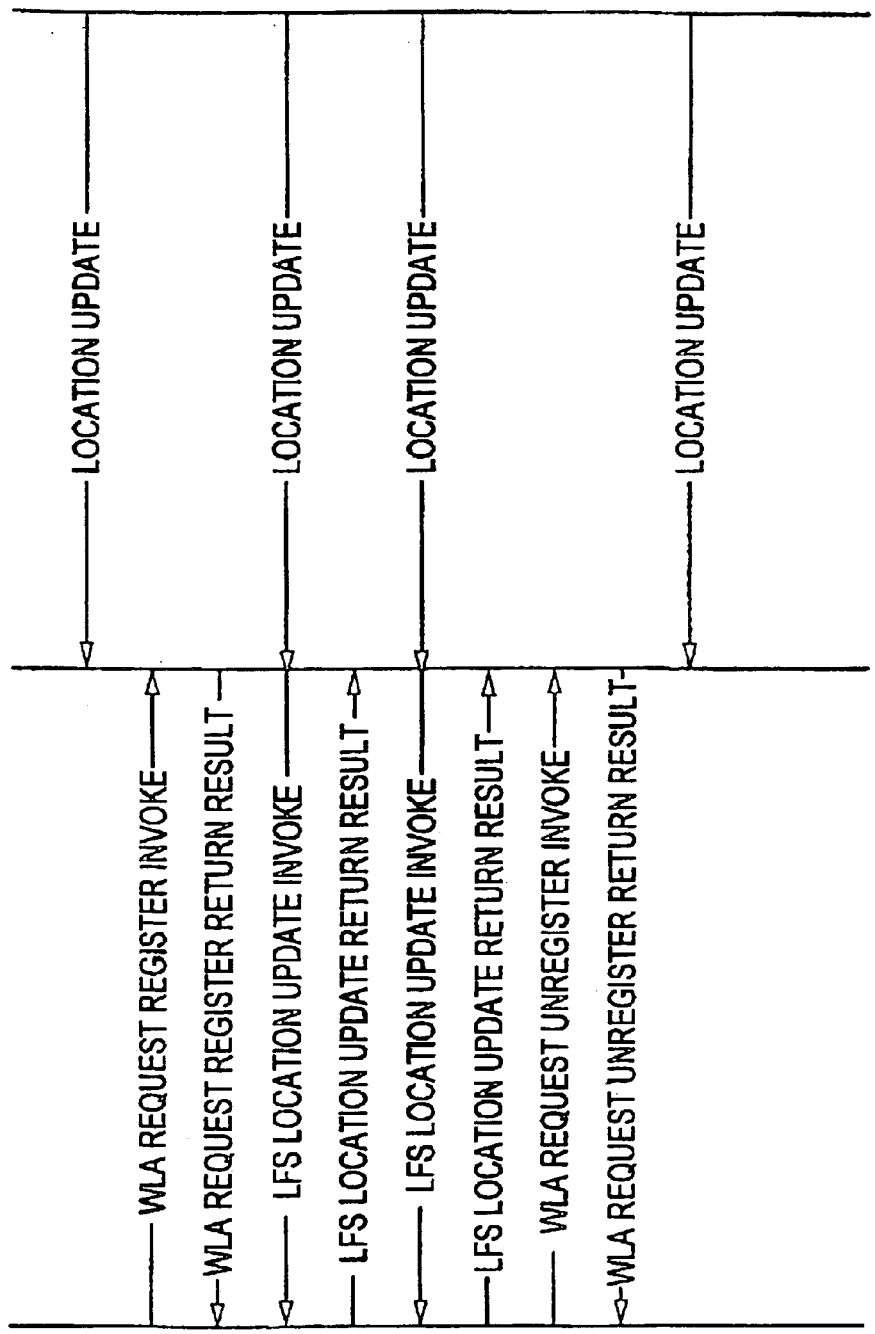

FIG. 9 shows a typical message sequence for the case where a WLA requests ongoing updates regarding the location of a wireless station. The update period is initiated upon transmission of a WLARequestRegisterInvoke message from the WLA to the LM and receiving a WLARequestRegisterReturnResult in confirmation; and terminates upon transmission of a WLARequestUnregisterInvoke message and receiving a WLARequestUnregisterReturnResult in confirmation. The parameters included in the Register message can include the wireless station ID, update interval, whether wireless station access should be forced, etc. As shown in the Figure, the LM receives Location Updates from time-to-time from the Location Determination Technology (LDT). It will be noted that only those Updates occurring between Registration and Unregistration are communicated to the WLA. In this regard, the Updates are communicated from the LM to the WLA via a LMLocationUpdateInvoke message and a LMLocationUpdateReturnResult is transmitted in confirmation.

The system 200 also includes a Geographic Information System (GIS) based module 222 for use in correlating geographic coordinate information to mapping information, e.g., street addresses, service area grids, city street grids (including one-way or two-way traffic flow information, speed limit information, etc.) or other mapping information. For example, it may be desired to convert the geographic coordinates of a 911 call to a street address for use by a dispatcher, or to correlate a call placement location to a wireless network billing zone. In this regard, the GIS module 222 may communicate with the LFCs 208, 210, and 212, the LFC 214 and/or the WLAs 226, 228 and 230 to correlate location information to GIS information, and to correlate GIS information to application-specific information such as wireless network billing zones. A suitable GIS based module 222 is marketed under the trademark MAPS by SignalSoft Corporation of Boulder, Colo.

Figure 10:
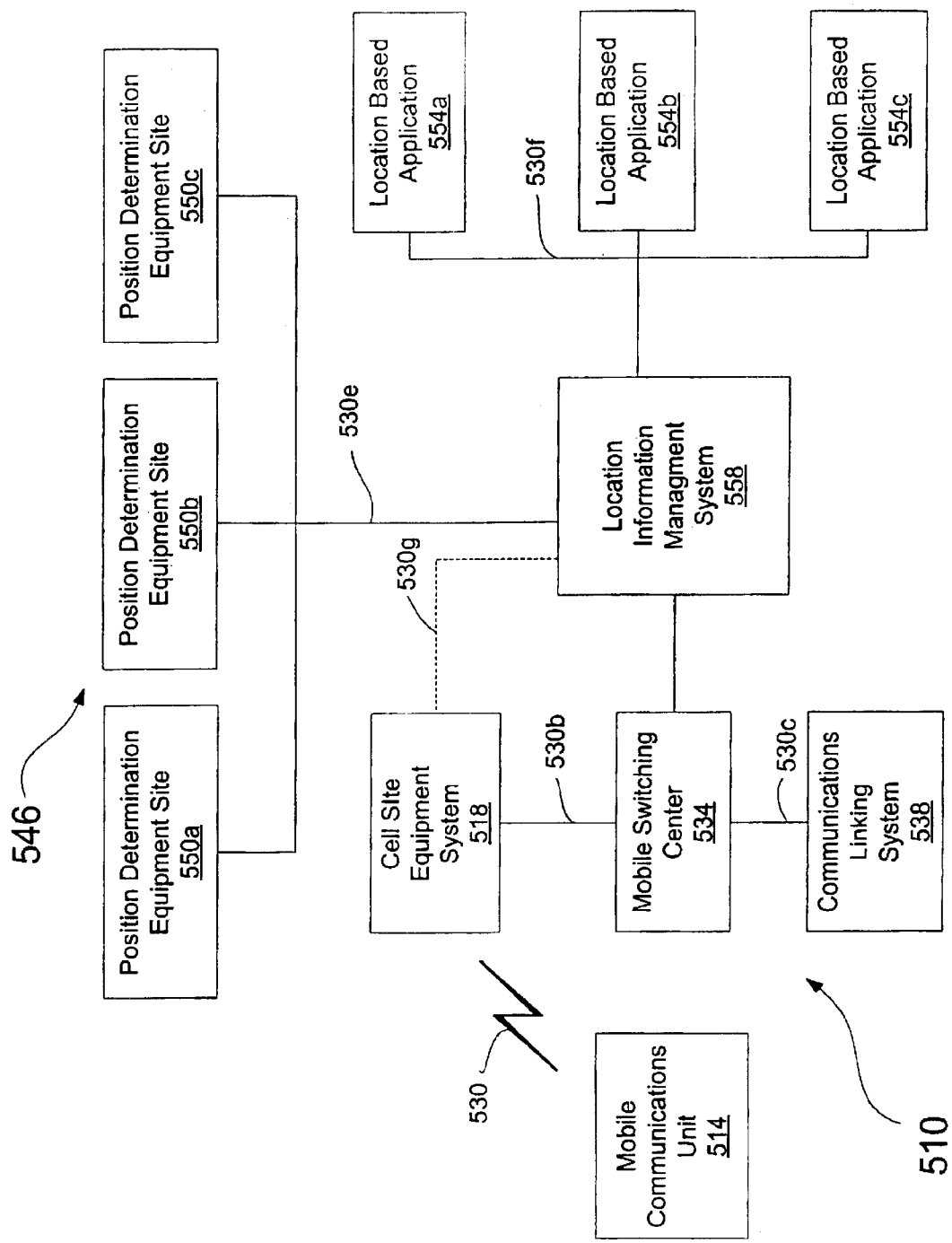
FIG. 10 is a schematic representation of an embodiment of a mobile communications systems which includes or which interfaces with a location information management system.
Figure 11:
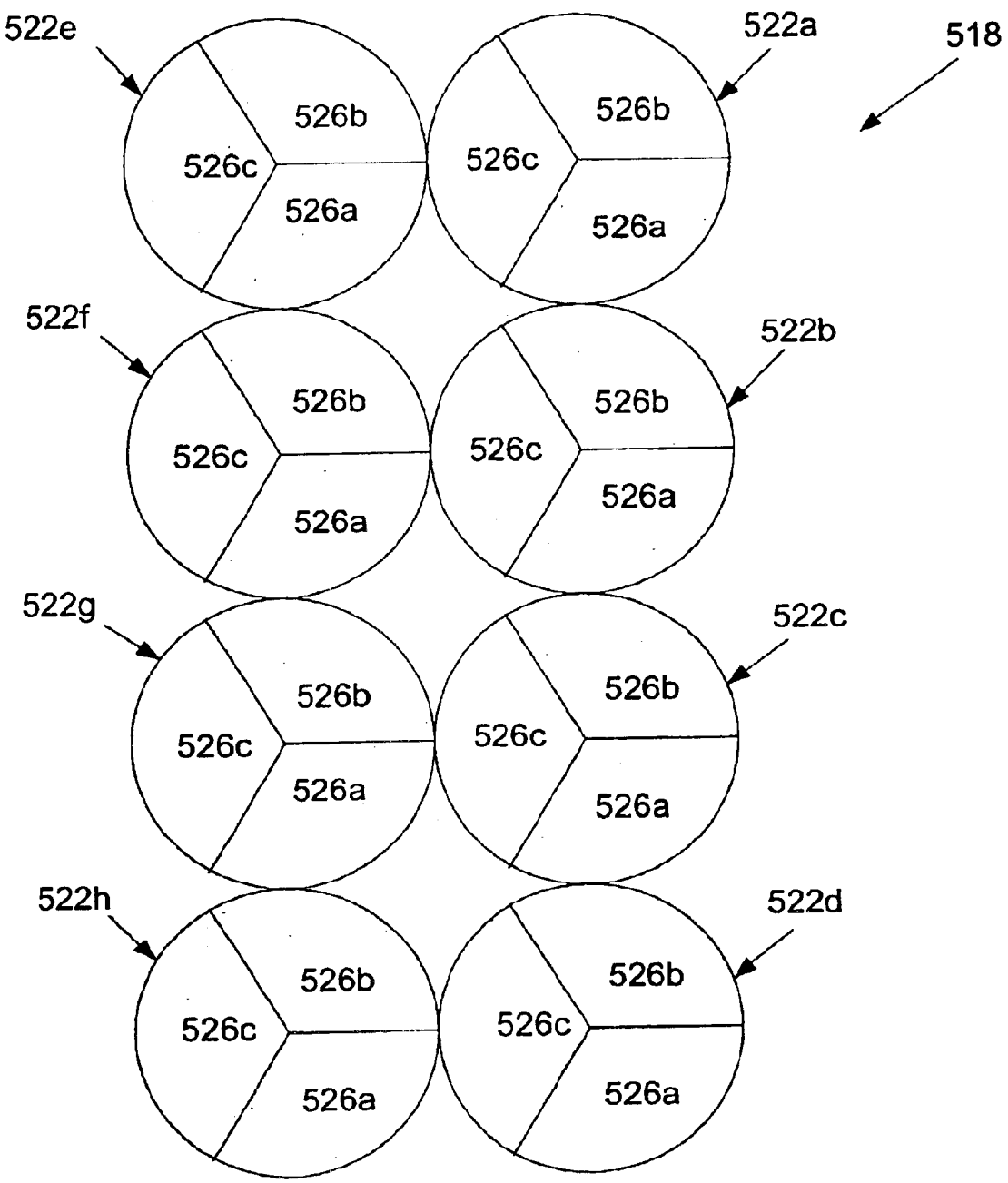
FIG. 11 is one embodiment of a cell/sector structure which may be utilized by the mobile communications system of FIG. 10.

Another embodiment of a mobile or wireless communications network or system 510 is presented in FIG. 10. The mobile communications system 510 includes at least one mobile communications unit 514 (e.g., a cellular phone) which communicates with a cell site equipment system 518 by an appropriate communications link 530a. One embodiment of at least a portion of this cell site equipment system 518 is illustrated in FIG. 11. The cell site equipment system 518 of FIG. 11 includes a plurality of cells 522. Each cell 522 includes a plurality of cell sectors 526. Each cell 522 and its various cell sectors 526 cover a certain geographical area. At least one transmitter and at least one receiver (or a "transceiver"), as well as at least one antenna (all not shown), are associated with each cell sector 526 for handling all communications involving any mobile communications unit 514 which is physically located within or possibly in proximity to the particular cell sector 526. Typically a single directional antenna will be utilized by each cell sector 526 in the type of configuration presented in FIG. 11, and the coverage area of the antennas in a given cell 522 will overlap to a degree. Although each of the cells 522 and cell sectors 526 are illustrated in FIG. 11 as being of the same size and configuration, such need not be the case in relation to the functionality of a location information management system 558 which is part of or at least operatively interfaces with the mobile communications system 510, and which is discussed in more detail below. Moreover, adjacent cells 522 may be disposed in overlapping relation without adversely affecting the functionality of the location information management system 558. In fact, it is believed that any configuration may be utilized by the cell site equipment system 518 without adversely affecting the functionality of the location information management system 558.

An appropriate communications link 530b operatively interconnects the cell site equipment system 518 with a mobile switching center 534 as illustrated in FIG. 10. The mobile switching center 534 in turn is operatively interconnected with a communications linking system 538 (e.g., a telephone company central office, one or more central switching offices) by an appropriate communications link 530c. Communications involving the mobile communications unit 514 are thereby directed through the cell site equipment system 518, the mobile switching center 534, and communications linking system 538 to the other device(s) involved in the subject communication. Any way of providing communication capabilities between a given mobile communications unit 514 and another communication device may be employed without adversely affecting the functionality of the location information management system 558.

The location information management system 558 may be directly operatively interconnected with the mobile switching center 534 by an appropriate communications link 530d, may be directly operatively interconnected with the cell site equipment system 518 by an appropriate communications link 530g (as indicated by the dashed line in FIG. 10), or both. Any way of integrating the location information management system 558 with the mobile communications network or system 510 may be utilized, including such that the system 558 is part of the system 510 or separate therefrom. Multiple components are part of or at least interface with the location information management system 558 in relation to communications involving any mobile communications unit 514 of the mobile communications system 510 (e.g., communications being directed through the mobile switching center 534). These components may either be part of or separate from the mobile communications system 510. One such component is a position determination equipment system 546 which is operatively interconnected with the location information management system 558 by an appropriate communications link 530e. The position determination equipment system 546 generally functions to determine the location of a particular mobile communications unit 514 for one or more purposes. In this regard, the position determination equipment system 546 generally includes a plurality of position determination equipment sites 550 which may be located at various physical locations throughout the mobile communications system 510. Any technology which is appropriate for determining the location of a given mobile communications unit 514 may be employed at any given position determination equipment site 550, including those discussed above. Representative examples of position determination technologies which are appropriate for the position determination equipment system 546 include GPS-based technologies, cell sector or micro-cell location technologies, time difference of arrival (TDOA) technologies, angle of arrival (AOA) or other network triangulation technologies, and enhanced observed time difference (EOTD), and TOA-assisted GPS.

Another component which is operatively interconnected with the location information management system 558 by an appropriate communications link 530f is one or more location-based applications 554. Location information regarding a particular mobile communications unit 514 may be desired or required by each of these location-based applications 554 for one or more purposes. Requests for location information from any of the location-based applications 554 is managed through/by the location information management system 558. Although the mobile communications system 510 has been described in accordance with the foregoing structure, the functionality of the location information management system 558 may be integrated in the mobile communications system 510 in any appropriate manner. For instance, the location information management system 558 may be readily adapted for any way of routing mobile or cellular communications.

One function of the location information management system 558 is to store various types of information on each position determination equipment site 550 which is utilized by the location information management system 558 or to otherwise associate cells 522 or cell sectors 526 with those position determination equipment sites 550 that are able to provide location information for a particular mobile communications unit 514 when in this particular cell 522 or cell sector 526. FIG. 12A presents one embodiment of a PDE site database 562 which may be utilized by the location information management system 558 to determine if location information may be provided on a particular mobile communications unit 514, and which will typically reside on an appropriate computer-readable storage medium. The PDE site database 562 may be at least generally viewed as containing a database record 566 on each PDE site 550 utilized by the location information management system 558. Each record 566 may include the following types of information which may each define their own separate database field of sorts: 1) a PDE site field 570 for storing information which somehow identifies and which is unique to the subject PDE site 550; 2) a position determination technology type field 574 for storing information which somehow identifies the type of technology which is utilized by the subject PDE site 550 to provide location information on a mobile communications unit 514; 3) a physical location field 578 for storing information on the physical location of the subject PDE site 550; 4) a coverage area field 582 for storing information that somehow defines the geographical area for which the subject PDE site 550 is able to provide location information on a mobile communications units of 514 (alone or possibly in combination with information in the corresponding physical location field 578); 5) a position determination accuracy field 586 for storing information which somehow quantifies the accuracy or uncertainty associated with location information on a mobile communications unit 514 which is provided by the subject PDE site 550; 6) a computational speed field 590 for storing information which somehow quantifies the amount of time required by the subject PDE site 550 to provide location information on a mobile communications unit 514; and 7) a computational cost field 594 for storing information which somehow quantifies the cost for providing location information on a mobile communications unit 514 utilizing the subject PDE site 550. With regard to the coverage area field 582, information contained therein may geographically define the coverage area of the associated PDE site 550. Alternatively, some type of function or parameter may be stored in the coverage area field 582 and which may somehow define the coverage area for the subject PDE site 550 (e.g., information in the coverage area field 582 may be a radius, which when combined with information in the physical location field 578, may be used to define the coverage area of the subject PDE site 550 through an equation for the area of a circle). It will be appreciated that any way of storing the type of information set forth in the PDE site database 562 may be utilized by the location information management system 558. Moreover, other types of information could be stored in relation to each PDE site 550 as well, and may then be made available to the location information management system 558. In any case, once the location information management system 558 determines or otherwise receives general location information on a particular mobile communications unit 540 in a manner to be discussed in more detail below, the location information management system 558 may consult the PDE site database 562 to determine if any of the PDE sites 550 stored therein would be able to provide location information on the particular mobile communications unit 514.

Figure 12B:
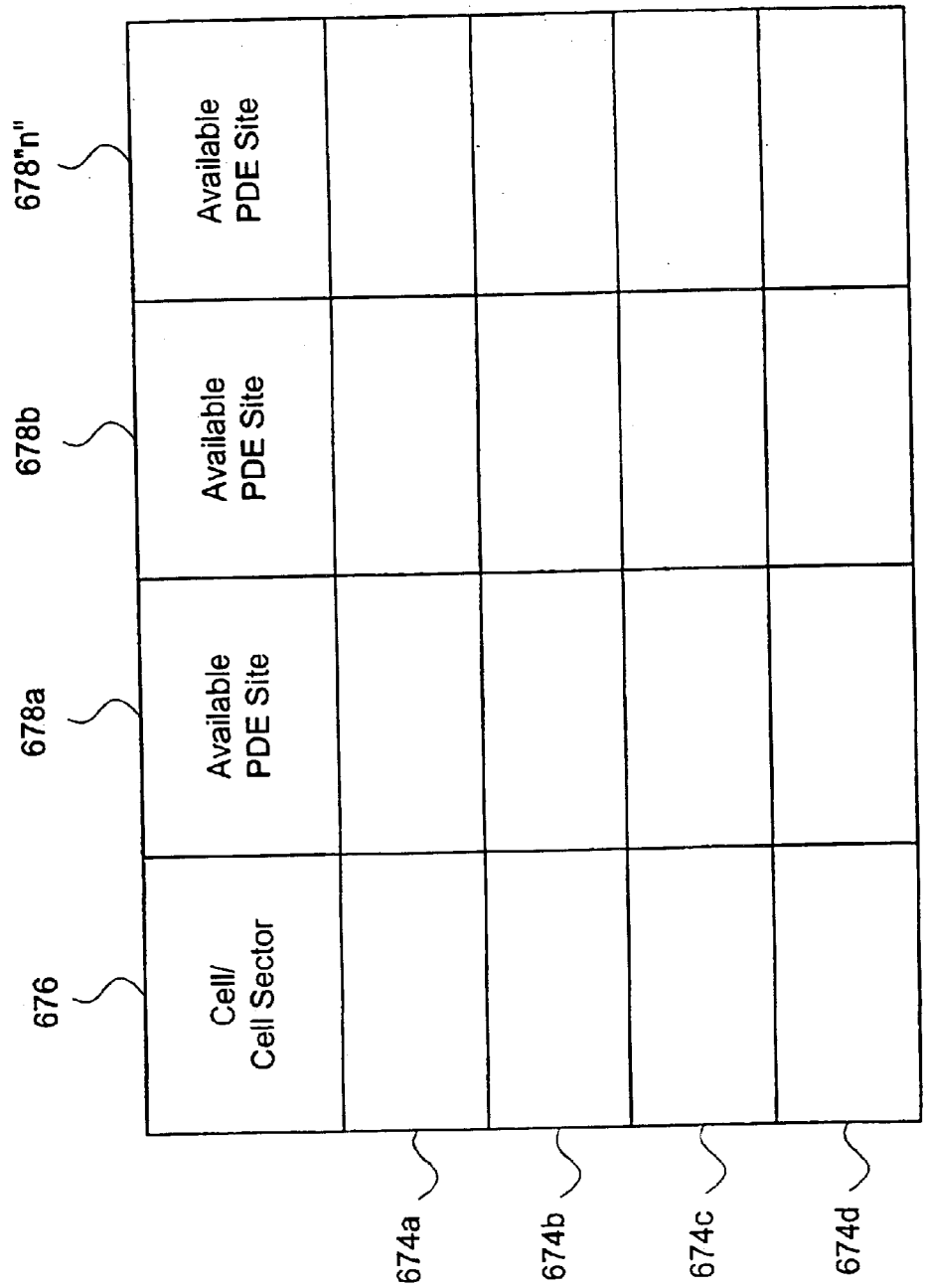
FIG. 12B is an embodiment of a cell/position determination equipment site database structure which may be utilized by the location information management system of FIG. 10.

FIG. 12B presents an embodiment of a cell/PDE site database 672 which may be utilized by the location information system 558 to determine if location information may be provided on a particular mobile communications unit 514, and which would typically reside on an appropriate computer-readable storage medium. The cell/PDE site database 672 may be at least generally viewed as containing a database record 674 on each cell 522 or cell sector 526 which is associated with the location information management system 558. Each record 566 may include the following types of information which may each define their own separate database field of sorts: 1) a cell or cell sector field 676 which somehow identifies a particular cell 522 or cell sector 526; and 2) one or more PDE site fields 678 which at least identify (e.g., via a server address) those PDE sites 550 that are available for providing location information on a particular mobile communications unit 514 when within the cell 522 or cell sector 526 associated with the particular record 674. The various specifications (e.g., any information required by the location information management system 558) of the various PDE sites 550 that are stored in relation to any record 674 within the cell/PDE site database 672 may be stored in the cell/PDE site database 672 itself or in another database (i.e., relational database information storage techniques may be utilized). Any data storage technique may be utilized. What is of importance is that each cell 522 or cell sector 526 encompassed by the location information management system 558 should be associated with a "list" of PDE sites 550 that would be able to provide location information on a particular mobile communications unit 514 when in this cell 522 or cell sector 526. That is, once the location information management system 558 determines or otherwise receives information on which cell 522 or which cell sector 526 a particular mobile communications unit 514 is currently located in, the location information management system 558 may consult the cell/PDE site database 672 to determine if there are any PDE sites 550 stored in relation to this cell 522 or cell sector 526 so as to be able to provide location information on the particular mobile communications unit 514.

Another function provided by the location information management system 558 is to manage requests for location information on mobile communications units 514 of the mobile communications system 510. Although these requests will typically be invoked by a location-based application 554 which somehow interfaces with the mobile communications system 510, the location information management system 558 contemplates providing location information on mobile communications units 514 to any "source"

which may somehow invoke a request for location information on a given mobile communications unit 514, directly or indirectly, to the location information management system 558. There are principally two "sources" of information of sorts which are utilized by the location information management system 558 to provide location information on a given mobile communications unit 514. One "source" is the above-noted PDE site database 562 of FIG. 12A or the cell/PDE site database 672 of FIG. 12B. In the latter case, this "source" is an association of a particular cell 522 or cell sector 526 with those PDE sites 550 that would be able to provide location information on a particular mobile communications unit 514 when in this particular cell 522 or cell sector 526.

Figure 13:
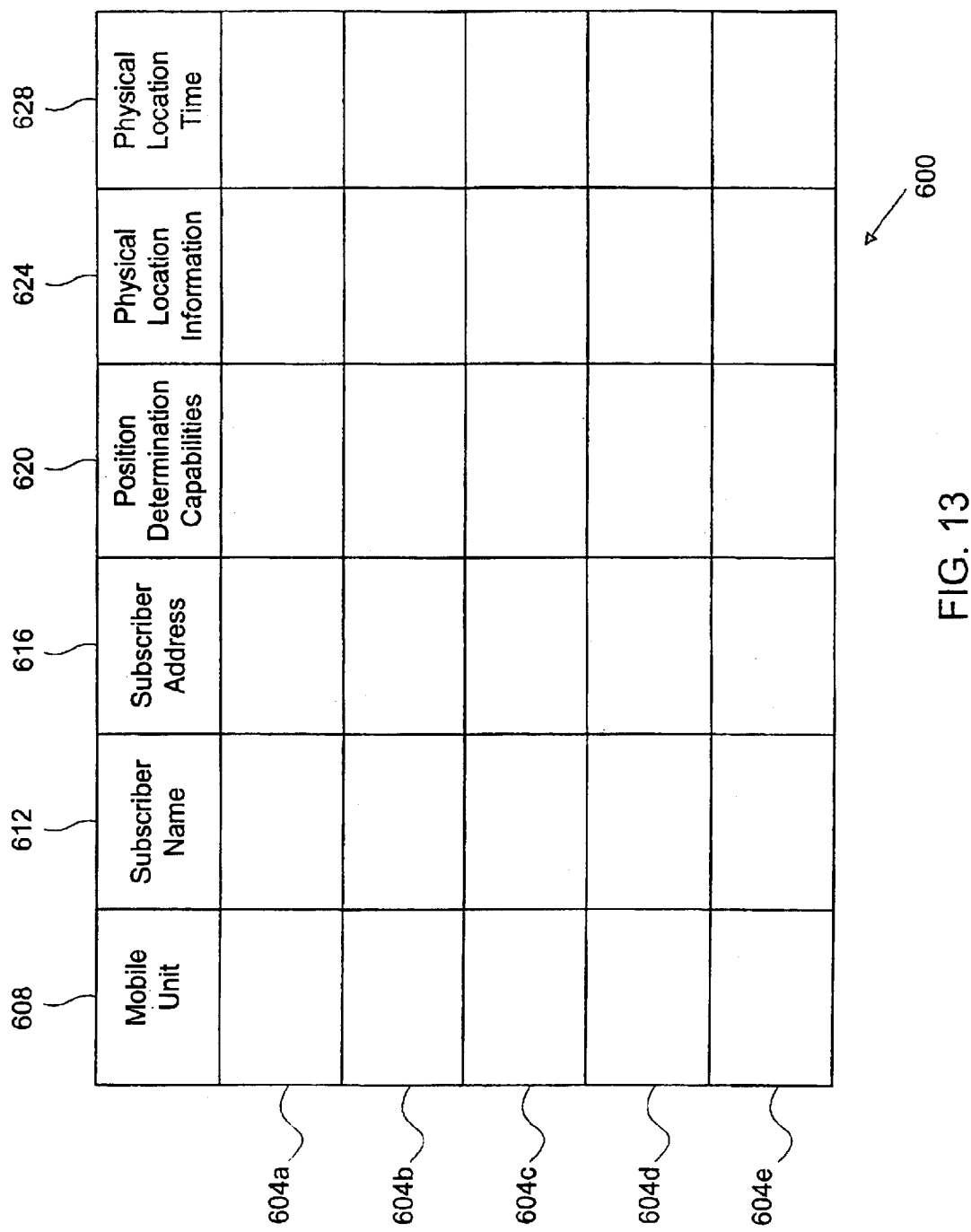
FIG. 13 is one embodiment of a home location register database structure which may be utilized by the location information management system of FIG. 10.

Another "source" of information may be utilized by location information management system 558 is a collection of information on each of the various mobile communications units 514 of the mobile communications network 510 which have been integrated with the location information management system 558. One way in which this information may be stored is illustrated in FIG. 13 and is in the form of a home location register database 600. As in the case of the PDE site database 562 and the cell/PDE site database 672, the home location register database 600 will typically reside on an appropriate computer-readable storage medium.

The home location register database 600 of FIG. 13 may be generally viewed as containing a database record 604 on each mobile communications unit 514 of the mobile communications system 510 which has been integrated with the location information management system 558. Each record 604 may include the following types of information which may each define their own separate database field of sorts: 1) a mobile unit field 608 for storing information which somehow identifies and which is unique to a particular mobile communications unit 514 (e.g., an Electronic Serial Number (ESN) or a Mobile Identification Number (MIN), a telephone number for the subject mobile communications unit 514); 2) a subscriber name field 612 for storing information which somehow identifies the party that has subscribed to the services provided by the mobile communications system 510 in association with the subject mobile communications unit 514; 3) a subscriber address field 616 for storing information which somehow identifies the address of the party that has subscribed to the services provided by the mobile communications system 510 in association with the subject mobile communications unit 514; 4) a position determination capabilities field 620 for storing information which somehow defines the position determination capabilities of the subject mobile communications unit 514 (e.g., whether the same includes a GPS transceiver or other handset-based location finding capabilities); 5) a physical location field 624 for storing information which somehow identifies what is typically the last known physical location of the subject mobile communications unit 514; and 6) a physical location time field 628 for storing information which somehow identifies the time associated with the information contained in the physical location information field 624 (e.g., the physical location information in the field 624 was obtained at a specified time on a specified day in a specified year). It will be appreciated that any way of storing the type of information set forth in the home location register database 600 may be utilized by the location information management system 558. Moreover, other types of information could be stored in relation to each mobile communications unit 514 as well, including further information which relates to the location information contained in the physical location field 624 (e.g., the accuracy or uncertainty of the specified physical information), and may then be made available to the location information management system 558. The location information management system 558 may consult the home location register database 600 upon receiving a request for location information on a particular mobile communications unit 514 to determine if the particular mobile communications unit 514 itself has location finding capabilities and/or to determine if the last known physical location of the particular mobile communications unit 514 satisfies the outstanding request for location information.

Figure 14:
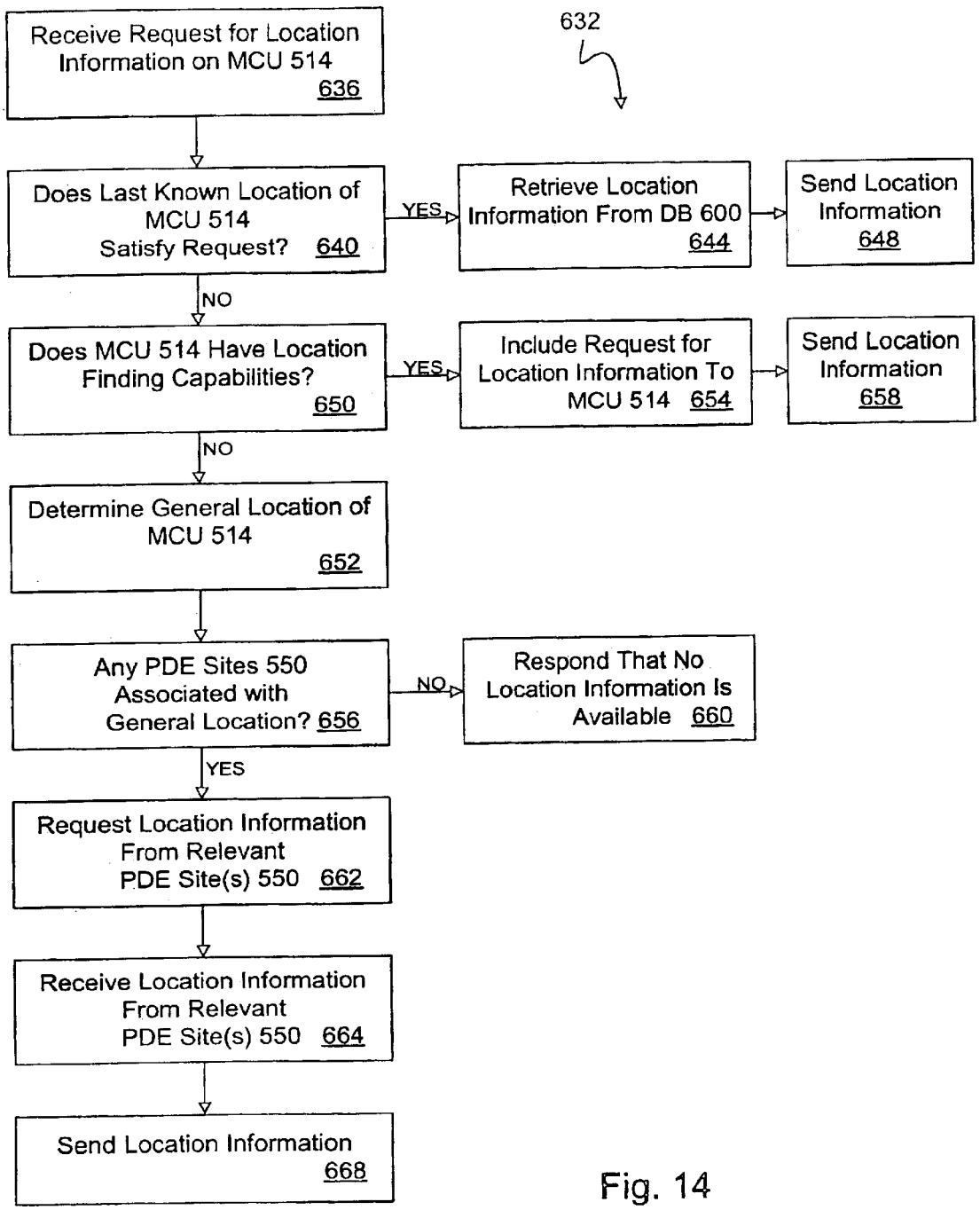
FIG. 14 is one embodiment of a location information management protocol which may be utilized by the location information management system of FIG. 10.

FIG. 14 presents one embodiment of a location information management protocol 632 which may be utilized by the location information management system 558 of FIG. 10 for addressing requests for location information on a particular mobile communications unit (MCU) 514. There are various ways in which the location information management system 558 may implement this protocol 632. One appropriate way is for the location information management system 558 to be in the form of a computer with at least one processor for executing the functionality of the protocol 632. However, any way of appropriately executing the protocol 632 in the context of the mobile communications system 510 may be utilized.

Step 636 of the location information management protocol 632 of FIG. 14 is directed to the location information management system 558 receiving a request for location information on a particular mobile communications unit 514. This request for location information may originate from one of the location-based applications 554 or from any source that interfaces with the location information management system 558. This request may include one or more requirements or prerequisites that are associated with the provision of this desired location information by the location information management system 558. Examples include a time requirement (e.g., to require that the location information be received by the designated recipient(s) within a specified amount of time or that the location information be of a certain "age"), a cost requirement (e.g., to require that the location information be provided for a specified amount or for no more than a specified amount), an accuracy requirement (to require that the location information be within a specified accuracy or uncertainty level), or any combination thereof. Other types of "requirements" could be included with the request contemplated by step 636, and the location information management system 558 could be adapted to store or at least have access to this type of information as well.

The location information management protocol 632 of FIG. 14 continues with step 640 which is directed to determining if the location information, in accordance with any requirements imposed by the request of step 636, is stored in the home location register database 600. The home location register database 600 again contains a database record 604 on each mobile communications unit 514 within the mobile communications system 510 which has been integrated with the location information management system 558. Each of these records 604 includes information on the last known physical location of the corresponding mobile communications unit 514 (in the physical location field 624), as well as the time associated with this last known physical location (in the physical location time field 628). Therefore, the location information management system 558 searches the home location register database 600 to identify the relevant database record 604 (e.g., that record 605 which has the information on the specific mobile communications unit 514 that was identified in the request associated with step 636). If the information in the physical location information field 624 and the physical location time field 628 of this record 604 meets all of the requirements specified in the request that is associated with step 636, step 644 of the location information management protocol 632 retrieves the information from the physical location field 624 of the relevant database record 604, while step 648 of the protocol 632 directs the transmission of this location information to the recipient designated by/in the request of step 636 (e.g., in accordance with the request of step 636, but typically back to the location-based application 554 which submitted the request associated with step 636). It should be appreciated that the location information management system 558 could also be configured to have one or more requirements which must be satisfied before the system 558 will use the location information from the home location register database 600 to respond to a request from step 636.

Another option for responding to a request for location information on a particular mobile communications unit 514 (from step 636) in accordance with the protocol 632 of FIG. 14 is to determine if the mobile communications unit 514 that is the subject of the request itself has location or position determination functionality. This is reflected by step 650 of the protocol 632 and may be executed by consulting the home location register database 600 (via information in the mobile unit field 608 to identify the relevant record 604, and by then consulting the corresponding position determination capabilities field 620). In the event that the mobile communications unit 514 that is the subject of the request does in fact have location finding capabilities, the location information management system 558 may invoke a request for location information to this particular mobile communications unit 514 through execution of step 654. When the location information is received by the location information management system 558 as a result of this invocation, the system 558 sends the location information to the recipient designated by/in the request of step 636 (e.g., in accordance with the request of step 636, but typically back to the location-based application 554 which submitted the request associated with step 636) through execution of step 658.

Another source of location information on a mobile communications unit 514 identified in the request of step 636 of the location information management protocol 632 of FIG. 14 utilizes the PDE site database 562 of FIG. 12A or the cell/PDE site database 672 of FIG. 12B, or similar information. Step 652 of the protocol 632 directs that at least the general location of the mobile communications unit 514 from the request of step 636 be determined or otherwise identified. One way in which this may be done is to determine which cell 522 or cell sector 526 is in communication with this particular mobile communications unit 514. Signals are exchanged on at least some basis between a given mobile communications unit 514 and the cell site equipment in the cell 522 or cell sector 526 in which the mobile communications unit 514 is physically located, including a signal which identifies the subject mobile communications unit 514. This typically requires that the mobile communications unit 514 be "turned on." Therefore, the mobile communications system 510 is thereby "searched" to identify which particular cell site equipment is currently communicating with the mobile communications unit 514. The "general location" of the mobile communications unit 514 associated with step 652 of the location information management protocol 632 may then be the coverage area that is associated with this particular cell site equipment. It is possible that more than one cell 522 or cell sector 526 may be in communication with the mobile communications unit 514 in the above-noted manner. The "general location" associated with step 652 may then include the coverage areas of each of these cells 522 or cell sectors 526 or simply the identification of the cell(s) 522 or cell sector(s) 526 in which the subject mobile communications unit 514 is currently located.

Identification of a least a general location of the mobile communications unit 514 through step 652 of the protocol 632 allows the PDE site database 562 or the cell/PDE site database 672 to be consulted to determine if any PDE sites 550 are "appropriate" for providing location information on the mobile communications unit 514 that is identified in the request associated with step 636. In the case of the PDE site database 652, generally the PDE site database 562 is searched to identify each database record 566 (each of which again is specific to a single PDE site 550) having information in its coverage area field 582 that includes at least part of, and more preferably encompasses the entirety of, the general location of the mobile communications unit 514 which was determined/identified by step 652 of the protocol step 632. Stated another way, those PDE sites 550 in the PDE site database 562 having a coverage area which overlaps or more preferably encompasses the known general location of the mobile communications unit 514 at issue are identified in step 656 of the location information management protocol 632. The comparison between the known general location from step 652 with the information in the coverage area field 582 of each record 566 in the PDE site database 562 may be direct (i.e., both may be similarly defined) or indirect (i.e., one or more other sources may need to be consulted and/or one or more conversions may be necessary to execute the comparison, for instance in the case where the "general location" from step 652 is an identifier for a specific cell sector 526, while the information in the coverage area field 582 of the PDE site database 562 is somehow expressed geographically by latitude and longitude). In the case of the cell/PDE site database 676 of FIG. 12B, the identification of the cell 522 or cell sector 526 in which the subject mobile communications unit 514 is currently located through execution of step 652 of the protocol 632 allows the location information management system 558 to retrieve the relevant record(s) 674 in the cell/PDE site database 672 and to determine if any PDE sites 550 are associated with the relevant record(s) 674.

It of course may turn out that none of the PDE sites 550 will be appropriate for determining the physical location of the mobile communications unit 514 that is associated with the request of step 636 of the location information management protocol 632 of FIG. 14. In this case, a response is sent by the location information system 558 through execution of step 660 of the protocol 632 which provides at least some type of indication that no location information is available for the mobile communications unit 514 which was the subject of the request of step 636. Searching the PDE database 562 and/or the cell/PDE site database 672 in the above-noted manner alleviates the time and expense for invoking a request to a particular PDE site 550 which would be unable to provide the location information on the desired mobile communications unit 514. That is, instead of sending a request for location information on a particular mobile communications unit 514 to each and every PDE site 550 utilized by the location information management system 558, the location information management system 558 first determines which, if any, of the PDE sites 550 could provide location information on the desired mobile communications unit 514 in accordance with the request of step 636 of the location information management protocol 632. Only then does the location information management system 558 invoke a request for location information through execution of step 662 of the location information management protocol 632 of FIG. 14.

There are various ways in which a request for location information on a particular mobile communications unit 514 may be invoked through execution of step 662. The protocol 632 may be configured such that a request for location information is sent to each PDE site 550 which is identified as being appropriate in step 656. Another option would be for the location information management protocol 632 to be configured to invoke a request for location information on a particular mobile communications unit 514 in relation to only a single PDE site 550. For instance, the location information system 558 may be configured to somehow identify the "best" PDE site 550 for providing location information on a particular mobile communications unit 514. The location information system 558 may also be configured to somehow "combine" or "aggregate" the location information from multiple PDE sites 550 into a single piece of aggregated location information. In any case, the desired location information is received through execution of step 664 of the location information management protocol 632, and is thereafter transmitted to the desired recipient through execution of step 668 of the protocol 632. It should be appreciated that the location information management system 558 could be configured to have the PDE site 550 of choice send the location information directly to the relevant location-based application 554.

The order in which the three sources of location information are "consulted" by the location information management system 558 in accordance with the protocol 632 of FIG. 14 (step 640 and its associated steps 644 and 648, step 650 and its associated steps 654 and 658, and step 652 and its associated steps 656–668) may be executed in any order. However, the order presented in FIG. 14 is currently preferred, namely such that first a determination is made as to whether the location information that is currently stored for a particular mobile communications unit 514 satisfies the outstanding request, followed by a determination as to whether the particular mobile communications unit 514 itself has location finding capabilities, followed by a determination if any PDE sites 550 would be able to provide the desired location information.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for providing location information regarding a mobile communications unit of a mobile communications system, comprising the steps of:
   receiving a first request for first location information on a first mobile communications unit;
   executing a first determining step comprising determining at least a general location of said first mobile communications unit;
   executing a second determining step comprising determining if a location information management system can provide said first location information, wherein said executing a second determining step comprises determining if any of a plurality of position determination equipment sites would be able to provide said first location information having knowledge of said at least a general location;
   executing a first responding step if said second determining step reveals that none of said plurality of position determination equipment sites would be able to provide said first location information, wherein said first responding step comprises indicating that said first location information is unavailable;
   invoking a request to a first position determination equipment site to provide said first location information only if said second determining step first reveals that said first position determination equipment site would be able to provide said first location information; and
   executing a second responding step after any execution of said invoking step, wherein said second responding step comprises sending said first location information.

2. A method, as claimed in claim 1, wherein:
   said mobile communications system further comprises a plurality of cells which each encompass a predetermined area, wherein said executing a first determining step comprises identifying said cell in which said first mobile communications unit is physically located.

3. A method, as claimed in claim 1, wherein:
   said mobile communications system further comprises a plurality of cells which each encompass a predetermined area, wherein each said cell comprises at least one sector which encompasses a predetermined area, and wherein said executing a first determining step comprises identifying said sector of said cell in which said first mobile communications unit is physically located.

4. A method, as claimed in claim 1, wherein:
   said executing a first determining step comprises consulting a mobile communications unit database, wherein a most recent known location of said first mobile communications unit is stored in said mobile communications unit database, along with a time associated with said most recent known location for said first mobile communications unit.

5. A method, as claimed in claim 1, wherein:
   said executing a first determining step is executed other than through any of said plurality of position determination equipment sites.

6. A method, as claimed in claim 1, wherein:
   said executing a second determining step comprises consulting a database in which information on said plurality of position determination equipment sites is stored.

7. A method, as claimed in claim 1, wherein:
   information on said plurality of position determination equipment sites is stored in a database, wherein said information comprises an identifier and a coverage area for each said position determination equipment site, and wherein said executing a second determining step comprises comparing said at least a general location of said first mobile communications unit with said coverage area of at least one of said position determination equipment sites that is included in said database.

8. A method, as claimed in claim 1, wherein: information on said plurality of position determination equipment sites is stored in a database, wherein said information comprises an identifier and a coverage area for each said position determination equipment site, and wherein said executing a second determining step comprises comparing said at least a general location of said first mobile communications unit with said coverage area of each said position determination equipment site that is included in said database.

9. A method, as claimed claim 1, wherein:
said second determining step is executed after said first determining step and is dependent upon said first determining step in that said second determining step requires knowledge of said general location from said first determining step.

10. A method, as claimed in claim 1, wherein:
said receiving a first request step comprises including at least one requirement regarding at least one aspect associated with said first location information in said first request.

11. A method, as claimed in claim 1, wherein:
said receiving a first request step comprises including a time limit for providing said first location information in said first request.

12. A method, as claimed in claim 1, wherein:
said receiving a first request step comprises including an acceptable level of uncertainty associated with said first location information in said first request.

13. A method, as claimed in claim 1, wherein:
said receiving a first request step comprises including an acceptable cost for receiving said first location information in said first request.

14. A method, as claimed in claim 1, wherein:
said executing a second responding step comprises providing said first location information from each said position determination equipment site identified by said executing a second determining step as being able to provide said first location information in accordance with said first request.

15. A method, as claimed in claim 1, further comprising the step of:
deriving said first location information using each said position determination equipment site identified from said executing a second determining step as being able to provide said first location information in accordance with said first request.

16. A method, as claimed in claim 1, wherein:
said executing a first determining step comprises identifying a cell in which said first mobile communications unit is currently located, and wherein said executing a second determining step comprises identifying all said position determination equipment sites that are currently associated with said cell in said location information management system.

17. A location information management system, wherein said system provides location information on mobile communications units of a mobile communications system, wherein said location information management system comprises:
a first data structure, wherein said first data structure comprises a plurality of first data entries, wherein each said first data entry is associated with its own position determination equipment site, wherein each said first data entry comprises first, second, and third data types, wherein said first data type is an identifier for a position determination equipment site associated with the particular said first data entry, wherein said second data type is at least associated with a physical location of said position determination equipment site associated with the particular said first data entry, and wherein said third data type is a coverage area for said position determination equipment site associated with the particular said first data entry; and a second data structure, wherein said second data structure comprises a plurality of second data entries, wherein each said second data entry is associated with its own mobile communications unit, wherein each said second data entry comprises fourth and fifth data types, wherein said fourth data type is an identifier for a mobile communications unit associated with the particular said second data entry, and wherein said fifth data type is indicative of position determination capabilities of said mobile communications unit associated with the particular said second data entry.

18. A location information management system, as claimed in claim 17, wherein:
each said second data entry further comprises sixth and seventh data types, wherein said sixth data type is a last known physical location of said mobile communications unit associated with the particular said second data entry, and wherein said seventh data type is a time and date associated with said last known physical location of said mobile communications unit associated with the particular said second data entry.

19. A method for providing location information on a mobile communications unit, comprising the steps of:
receiving a first request at a location information management system, wherein said first request is for first location information on a first mobile communications unit;

determining if said location information management system can provide said first location information, wherein each of first, second, and third determining steps are available for said determining step, wherein said first determining step comprises determining if said first mobile communications unit has position determination capabilities, wherein said second determining step comprises determining if said first location information in accordance with said first request is stored on said location information management system, and wherein said third determining step comprises invoking a request for said first location information to a first position determination equipment site only if said first position determination equipment site can provide said first location information in accordance with said first request;

executing a first responding step if said location information management system is unable to provide said location information, wherein said first responding step comprises indicating that said first location information is unavailable and in accordance with said first request; and executing a second responding step if said location information management system is able to provide said location information, wherein said second responding step comprises sending said first location information in accordance with said first request.

20. A method for providing location information on a mobile communications unit, comprising the steps of:
receiving a first request at a location information management system, wherein said first request is for first location information on a first mobile communications unit; and determining if said location information management system can provide said first location information, wherein each of first and second determining steps are available for said determining step, wherein said first determining step comprises determining if said first mobile communications unit has position determination capabilities before invoking a request to said first mobile communications unit for said first location information, and wherein said second determining step comprises invoking a request for said first location information to a first position determination equipment site only if said first position determination equipment site can provide said first location information in accordance with said first request.

21. A method, as claimed in claim 20, wherein:

said second determining step is executed only if said first determining step is unable to provide said first location information in accordance with said first request.

22. A method, as claimed in claim 20, wherein:

said first determining step is executed only if said second determining step is unable to provide said first location information in accordance with said first request.

23. A method, as claimed in claim 20, further comprising the steps of:

executing a first responding step if said location information management system is unable to provide said location information, wherein said first responding step comprises indicating that said first location information is unavailable and in accordance with said first request; and executing a second responding step if said location information management system is able to provide said location information, wherein said second responding step comprises sending said first location information in accordance with said first request.

* * * * *